(12) United States Patent
Goes et al.

(10) Patent No.: US 11,901,706 B2
(45) Date of Patent: Feb. 13, 2024

(54) OPERATOR-SAFE ELECTRICAL SYSTEM ENCLOSURE

(71) Applicant: INFINITE ENERGY CONSTRUCTION, INC., Kansas City, MO (US)

(72) Inventors: Nilson Mendes Goes, Village of Loch Lloyd, MO (US); Timothy Allen Albertson, Lawrence, KS (US)

(73) Assignee: Infinite Energy Construction, Inc., Kansas City, MO (US)

( * ) Notice: Subject to any disclaimer, the term of this patent is extended or adjusted under 35 U.S.C. 154(b) by 632 days.

(21) Appl. No.: 17/099,278

(22) Filed: Nov. 16, 2020

(65) Prior Publication Data

US 2022/0158422 A1 May 19, 2022

(51) Int. Cl.
| | | |
|---|---|---|
| *H01R 13/00* | (2006.01) | |
| *H02B 1/24* | (2006.01) | |
| *H01R 13/703* | (2006.01) | |
| *H02B 1/46* | (2006.01) | |
| *B64F 1/36* | (2017.01) | |
| *H01R 13/70* | (2006.01) | |
| *H02G 3/08* | (2006.01) | |
| *H01R 13/04* | (2006.01) | |
| *H02B 1/06* | (2006.01) | |

(52) U.S. Cl.
CPC .............. *H02B 1/24* (2013.01); *B64F 1/362* (2013.01); *H01R 13/701* (2013.01); *H01R 13/7036* (2013.01); *H02B 1/46* (2013.01); *H02G 3/081* (2013.01); *H01R 13/04* (2013.01); *H02B 1/066* (2013.01)

(58) Field of Classification Search
CPC .. H02B 1/24; H02B 1/46; H02B 1/066; B64F 1/362; H01R 13/701; H01R 13/7036; H01R 13/04; H02G 3/081
See application file for complete search history.

(56) References Cited

U.S. PATENT DOCUMENTS

| | | | | |
|---|---|---|---|---|
| 2007/0040063 A1* | 2/2007 | McCoskey | ................ | B64F 1/36 244/114 R |
| 2007/0051852 A1* | 3/2007 | McCoskey | ................ | B64F 1/28 244/114 R |
| 2011/0050430 A1* | 3/2011 | Wright | .................... | B64F 1/305 340/584 |

(Continued)

*Primary Examiner* — Abdullah A Riyami
*Assistant Examiner* — Nelson R. Burgos-Guntin
(74) *Attorney, Agent, or Firm* — Shook, Hardy & Bacon L.L.P.

(57) ABSTRACT

Aspects herein are directed to an electrical system enclosure. The electrical system enclosure can include an electrical housing unit that includes one or more electrical components. The electrical system enclosure can further include a receptacle coupled to an outside surface associated with the electrical housing unit. The receptacle may be configured to engage a connector component of a cable. The electrical system enclosure can further include a contactor within the electrical housing unit. The contactor may be configured to energize based at least in part on the receptacle engaging the connector component. The electrical system enclosure may include an energy supply component configured to cause energy to be transmitted through the receptacle and the cable to a device outside of the electrical housing unit based on the contactor energizing.

20 Claims, 15 Drawing Sheets

(56) References Cited

U.S. PATENT DOCUMENTS

| | | | |
|---|---|---|---|
| 2014/0193998 A1* | 7/2014 | Zomchek | H01R 31/005 |
| | | | 439/488 |
| 2016/0356638 A1* | 12/2016 | Trottier | G01F 25/24 |
| 2017/0032686 A1* | 2/2017 | Alonso Tabares | B64F 1/362 |
| 2017/0302888 A1* | 10/2017 | Mehrholz | B64F 1/36 |
| 2018/0077391 A1* | 3/2018 | Siminoff | H02G 3/081 |
| 2021/0394930 A1* | 12/2021 | O'Toole | B60L 53/80 |
| 2022/0073214 A1* | 3/2022 | Liske | B64C 39/02 |
| 2022/0141143 A1* | 5/2022 | Catarino | B60L 53/30 |
| | | | 370/254 |

* cited by examiner

OPERATOR-SAFE ELECTRICAL SYSTEM ENCLOSURE

BACKGROUND

Each year thousands of operators using electrical system enclosures, such as electrical cabinets, are injured or killed by circuits due to electrical shock. In some instances, operator error is to blame. For example, operators may think circuits are turned off when in fact they are not. In other instances, the electrical components within these electrical system enclosures become faulty without operator error. In either case, operators are at risk because in order to use or inspect these traditional electrical system enclosures, operators must open doors or panels to these enclosures. This exposes the operators to raw voltage of live electrical components and thus potential electrical shock.

DESCRIPTION OF THE DRAWINGS

Examples of aspects herein are described in detail below with reference to the attached drawings figures, wherein.

DETAILED DESCRIPTION

Figure 1:
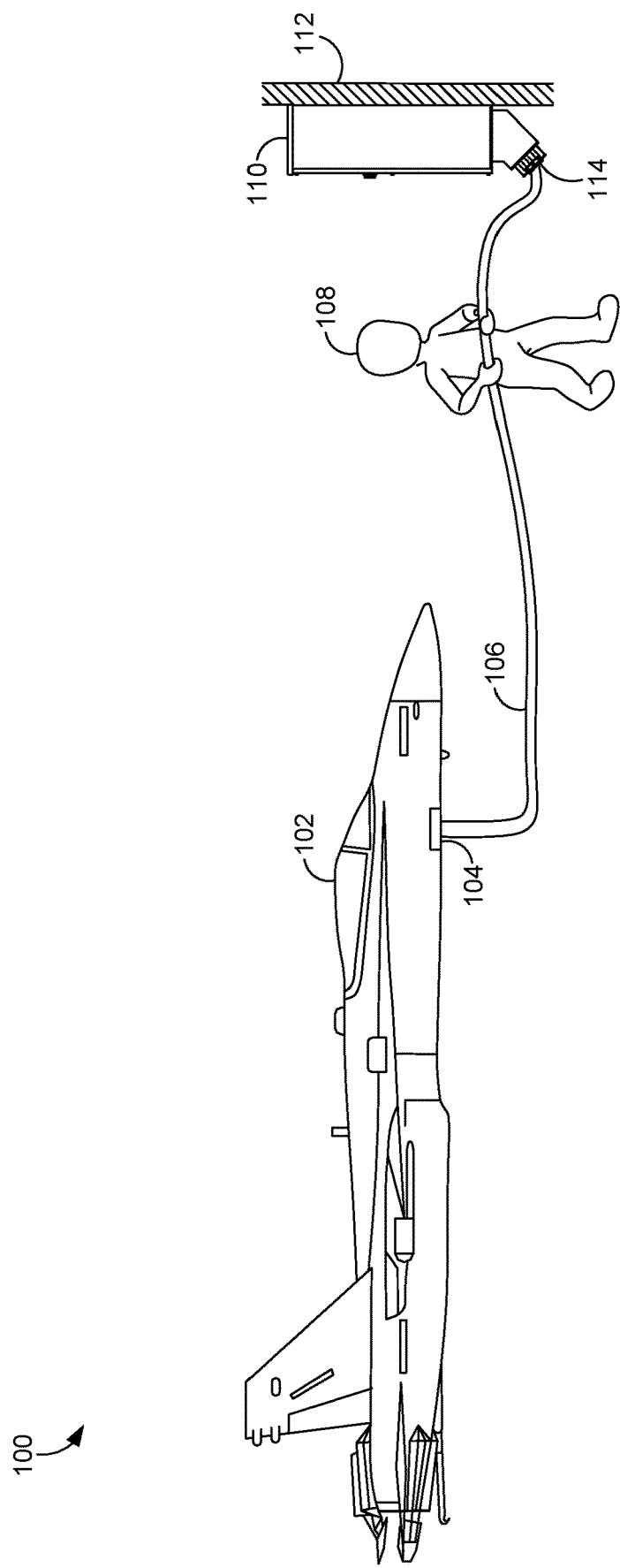
FIG. 1 illustrates a side perspective view of an example system for providing auxiliary power to a device, in accordance with aspects herein.

The subject matter of the present invention is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

Traditionally, an operator uses (or inspects) an electrical system enclosure by first putting on Personal Protective Equipment (PPE), such as a face shield, insulated gloves, and an arc flash suit. This equipment may reduce the magnitude of injury caused by electrical shock. The operator then opens a door or panel of an electrical system enclosure. The operator must then locate and activate a mechanical disconnect switch, which de-energizes the circuits (to prevent electrical shock) within the electrical system enclosure so that the operator can perform further work. For example, the operator may need to inspect the electrical components for any faulty wires, connections, components, and the like. In another example, the operator may need to locate an outlet or other terminal located within the electrical system enclosure in order to plug a cable into the outlet so as to power a particular load (e.g., a boat, aircraft, vehicle). However, even with the disconnect switch and PPE, any work performed still requires operators to open the enclosure and thus be exposed to electrically live parts, which can still cause injury or death. For example, after opening the electrical system enclosure door and while attempting to activate the disconnect switch, the operator may accidentally come in contact with a live circuit and experience electric shock. In another example, electric shock may still be felt by insufficiently insulated gloves when the voltage is extremely high. In yet another example, even if the operator activates a disconnect switch, the disconnect switch itself may be faulty or not work such that any subsequent work will expose the operator to electric shock.

Various embodiments of the present disclosure improve these existing electric system enclosures and mitigate or remove each of the problems described above, as well as other problems. At a high level, certain aspects herein relate to an electrical system enclosure that does not require an operator to open a panel or door of the enclosure exposing components within the enclosure to perform work. In this way, operators may not have to wear any or at least the same level of PPE because they will likely not come into contact with live electrical components within the enclosure, which means they are significantly less likely to experience electrical shock.

Some aspects are directed to an electrical system enclosure having a first volume of space (e.g., six-sided rectilinear structure) forming a substantially enclosed volume containing one or more electrical components and the electrical enclosure also includes an extension (e.g., a protruding panel) that forms a second volume of space that is coupled to and/or extending from an outside surface of the first volume of space defining an electrical housing unit (e.g., a cabinet) of the electrical system enclosure. Some aspects additionally or alternatively include a receptacle (e.g., a set of prongs, contacts, terminals, or an outlet with apertures configured to receive prongs) coupled to, extending from, or as a part of the extension or outside surface of the electrical housing unit. In some aspects, the receptacle is configured to engage or be plugged into a connector of a cable. For example, if the receptacle includes male prongs (or pins), the prongs can be configured to be plugged into a set of corresponding apertures on a female connector of a cable. In this way, operators can simply plug in a cable to the receptacle located outside of an electrical housing unit to power a device without having to open a panel or door of the electrical system enclosure that would expose one or more of the electrical components enclosed therein and may thus avoid potential electrical shock and injury. In an example where the receptacle includes male prongs that may be contacted by the operator, aspects provided herein in may further limit the operator's potential exposure to potential electrical shock and injury.

In some aspects, an electrically-controlled switch (e.g., a contactor or relay) within the electrical housing unit is configured to activate (e.g. close) or energize based, at least in part, on the receptacle engaging the connector component. This engagement may trigger or cause energy to be transmitted through the receptacle and cable to power a device (e.g., an aircraft, ship, vehicle) outside of and remote from the electrical housing unit. In some aspects, the receptacle includes a set of safety pins that are configured to activate a safety circuit that grounds a ground wire of the receptacle (or de-energizes the receptacle) such that the operator should not have exposure to experience electrical shock. In some aspects, only when the safety circuit is activated, will the electrically-controlled switch activate so as to allow energy to be transmitted to the device outside of the electrical housing unit. This improves existing electrical system enclosures that require the opening of a door or panel removal of an enclosure and manual input of an operator to activate a mechanical disconnect switch described above. Accordingly, in aspects contemplated herein, the operator does not have to remember or otherwise engage in manual de-energizing methods, which require opening the enclosure. Rather, electrical components will not activate or are not energized until a cable is connected to the receptacle. A benefit of this configuration can be experienced when the receptacle includes exposed male prongs that could otherwise be energized prior to the engagement of the connector component without use of the provided safety pins and associated safety circuit.

In yet other aspects, the electrical housing unit includes various indicators (e.g., lights or displays) and/or switch interfaces (e.g., buttons) such that the operator can interface with an electrical system enclosure and receive various indications without having to open a panel or door of the enclosure. For example, in some aspects, the electrical housing unit includes an activation component (e.g., a "start" button) that is configured to receive an operator request to provide power to a device. In another example, the electrical housing unit includes a hertz meter that is useful for operators who desire to see whether the appropriate frequency is being outputted. As described herein, certain loads, such as aircrafts, for example, may require 400 Hz. If the hertz meter indicates that the frequency is only operating at 50 or 60 Hz, the operator may see that she needs to input and run a converter to reach the 400 Hz frequency.

In yet another example of indicators, the electrical housing unit can include a power availability indicator that indicates whether or not there is power available to supply to a device. Alternatively or additionally, the electrical housing unit can include a volt meter, and/or an auditory (or other perceptible indicator) alarm mechanism so that inspectors or other operators do not have to test live electrical components by removing a panel or opening a door to the enclosure. Each of these indicators are described in more detail below.

Electrical terms and symbols as used herein such as "contactor," "relay," "varistor," "rectifier," "suppressor," "capacitor," "switch," "power supply," "power block," and the like are to be given their common meaning with respect to electrical circuits and components described herein.

The term "electrical housing unit" refers to an enclosure or assembly of an electrical system enclosure that covers or houses one or more electrical components. For example, an electrical housing unit may be an electrical cabinet, a circuit box, circuit panel, fuse box, service panel, junction box, and the like that are structural volumes that enclose or otherwise contain one or more electrical components. An "electrical component" may refer to any suitable electric component, device, and/or circuitry, such as a power supply, output power block, contactor, rectifier, varistor, and the like. These electrical components may be located within or covered by an electrical housing unit.

The term "electrically-controlled switch" refers to a switch that is activated and/or deactivated (i.e., opened or closed) by a circuit or electrical component. In various aspects, electrically-controlled switches are not mechanical switches (e.g., bush buttons, levers) that operators use to activate or deactivate. Rather, in some aspects, the electrically-controlled switch is controlled or activated/deactivated by electrical components and not by direct input by an operator. Examples, of electrically-controlled switches are contactors and relays. An "operator" refers to any user of an electrical system enclosure. For example, an operator can be a technician that inspects the enclosure, an aircraft pilot plugging a cord into a receptacle on the enclosure to provide power to an aircraft, or any other user that interfaces or engages with the electrical system enclosure for any purpose.

Turning now to FIG. 1, illustrated is a side perspective view of an example system 100 for providing auxiliary power to a device, according to some embodiments. The device of FIG. 1 is depicted in the form of an aircraft 102, but it is understood that the device may be any device, such as a vessel for use in water, a vehicle for use on land, a ground power device supporting an aircraft, an aircraft support device (e.g., armaments support), and/or a craft for use in air. As illustrated in the system 100, the operator 108 plugs a first end of a cable 106 into a receptacle 114, which is external to or coupled to an outside surface of the electrical system enclosure 110. The system 100 further illustrates that the electrical system enclosure 110 is mounted to a wall 112. It is understood that the wall 112 is representative only and as such, the electrical system enclosure 110 can be mounted to any suitable surface, such as a vehicle (e.g., a ground power unit (GPU)) or stand-alone movable unit (e.g., a cart)). The operator 108 also plugs a second end of the cable 106 into a component 104 (e.g., another receptacle, socket, or machine), which is coupled to the device, such as aircraft 102. In this way, energy can be transferred from the electrical system enclosure 110 to the aircraft 102 via the cable 106 so that one or more components of the aircraft (e.g., flight controls, air conditioning, televisions, etc.) can be powered from shore power (e.g., a remote power source independent of the vehicle) provided by the electrical system enclosure 110. In a similar way, energy can be transferred from the electrical system enclosure 110 to any contemplated device, such as an armaments loading device for aircraft via the cable 106 so that one or more components of the armament loading device can be powered from shore power (e.g., a remote power source independent of the vehicle) provided by the electrical system enclosure 110. Such energy transfer can happen without the operator 108 opening a panel or door of the electrical system enclosure 110, as illustrated in FIG. 1.

The electrical system enclosure 110 supplies at least some of the power needed to the aircraft 102 (or components of the aircraft) even if the engine(s) of the aircraft 102 are shut down. Shore power saves consumption of fuel that would otherwise be used to power the aircraft 102 in port. Using shore power may facilitate maintenance of the aircraft 102's engines and power generation components. In some aspects, the electrical system enclosure 110 is used to supply electric power for the aircraft 102 while the aircraft is on the ground to sustain interior lighting, ventilation, and other requirements before starting the main engine(s) or the aircraft auxiliary power unit (APU).

Although the device coupled to the component 104 is illustrated as being an aircraft 102, the device or load may alternatively be any suitable machine, device, or load such as a boat, a car or other ground vehicle, an aircraft supporting vehicle, a helicopter, a drone, a generator, a golf cart, fan, or any other apparatus that needs power to function or needs to recharge.

Figure 2:
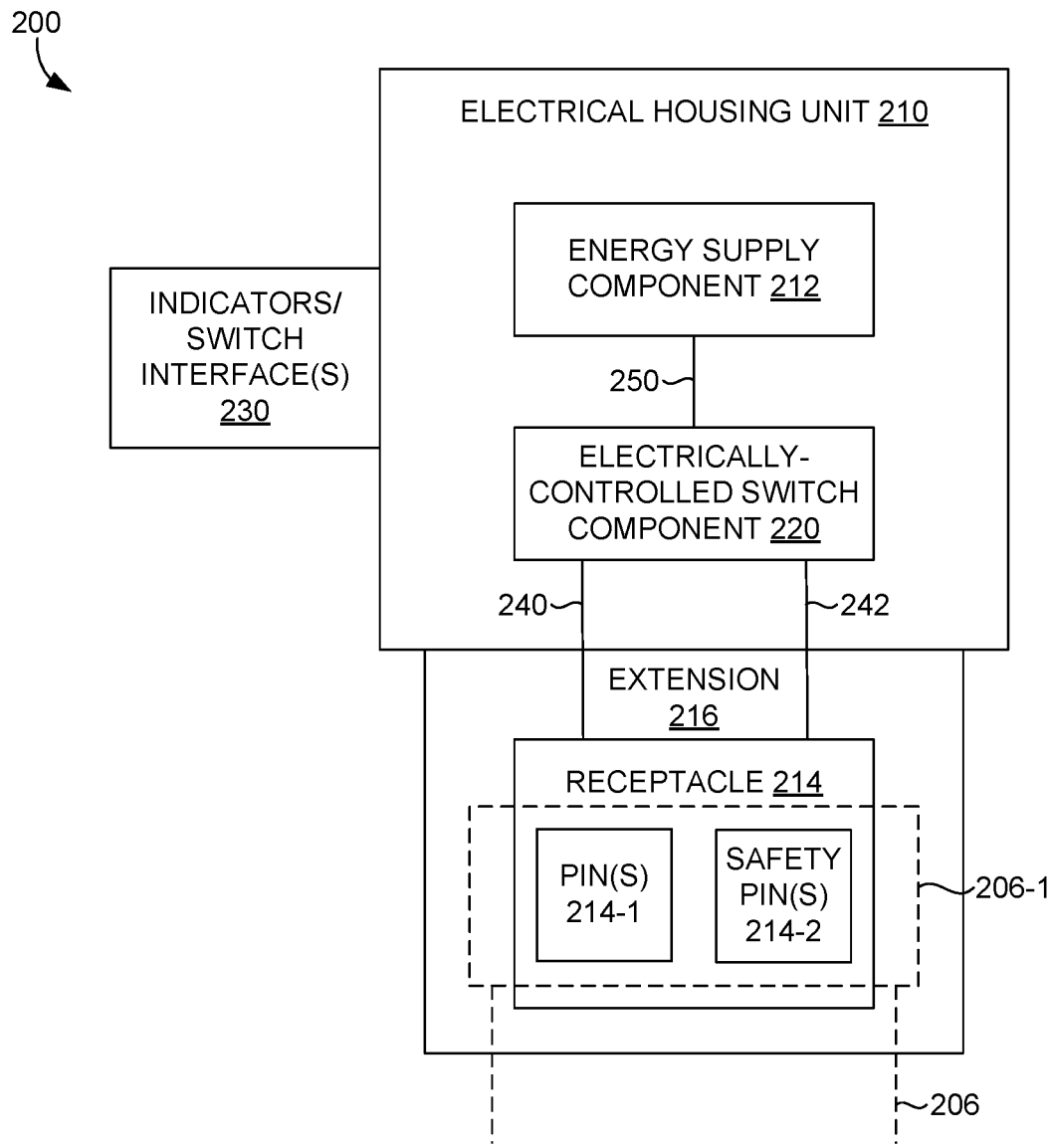
FIG. 2 is a block diagram of an example system, in accordance with aspects herein.

FIG. 2 illustrates a block diagram of an example system 200, according to some embodiments. In some aspects, the system 200 represents one or more components of the system 100. For example, in some aspects, the electrical housing unit 210 represents one or more portions of the electrical system enclosure 110 and vice versa. Likewise, in some embodiments, the receptacle 214 represents the receptacle 114 of FIG. 1 and vice versa. Likewise, in some embodiments, the cable 206 represents an end of the cable 106 of FIG. 1 and vice versa.

The system 200 includes the electrical housing unit 210, which is coupled to the extension 216. The extension 216 includes the receptacle 214. The system 200 also includes a first end of a cable 206 that includes a connector 206-1. The connector 206-1 is configured to be connected or plugged into the receptacle 214. The system 200 also includes the one or more indicators and/or switch interface(s) 230 (e.g., buttons, levers, or human-controlled switches), which are coupled to or accessible from an outside surface of the electrical housing unit 210.

The extension 216 is any suitable article of manufacture or apparatus that is coupled to or extending from an outside surface of the electrical housing unit 210. The extension 216 extends out above or beyond a surface or boundary of the electrical housing unit 210. For example, the extension 216 can be a lip, a panel, or any other jutting article. The extension 216, in the provided example, allows the operator to easily place the connector 206-1 over the receptacle 214 without having to open up a panel or door of the electrical housing unit 210. The extension 216 may be formed from any material, such as metal or a polymeric composition. The extension 216 may be formed integrally with the electrical housing unit 210. The extension 216 may be joined with the electrical housing unit 210. The extension 216, in an example, is an enclosure that is coupled with the electrical housing unit 210, but extends from the electrical housing unit 210 allowing for ease of access by the connector 206-1 to the receptacle 214 while physically isolating access of the receptacle 214 from the electrical connection within the electrical housing unit 210.

The receptacle 214 forms a part of or is connected to the extension 216. In various aspects, receptacle 214 includes a male set of electrically conductive prongs or pin(s) 214-1 and the safety pin(s) 214-2. An example of a receptacle that may be implemented as the receptacle 214 will be discussed in greater detail in connection with FIG. 12 hereinafter. The pin(s) 214-1 may connect to a circuit 240, which includes live wires and/or neutral wires in some aspects. As used herein, "wires" is not limited to a discrete collection of electrically conductive filaments in a twisted relationship. Instead, the term wires includes a pathway of electrical conduction, such as cable, bands, rods, pins, solder, portion of circuits, and the like. Live (or "hot") wires carry energy and more voltage relative to neutral wires. Neutral wires may include a return path for current provided by hot wires. Neutral wires are typically connected to an earth ground. The safety pin(s) 214-2 are configured to mate with a safety circuit 242 so as to energize (e.g., close) the electrically-controlled switch component 220, which, in some embodiments, is required to allow energy to be transferred outside of the electrical housing unit 210 to a load. In some aspects, the safety circuit 242 and the safety pin(s) 214-2 includes a ground wire. A ground wire is also typically connected to an earth ground. In some aspects, the ground wire does not typically form part of the live circuit of the wire(s) 240. Conversely, the ground wire may be coupled to or connected to any metal or conductive parts of an electrical system enclosure (e.g., the electrical housing unit 210 and the extension 216) as a safety mechanism in case hot wires come in contact with metal or conductive parts. In this way, when an operator touches any of the metal or conductive parts, he or she may not be subject to electrical shock.

Alternatively or additionally in some aspects, the safety circuit 242 is connected to some or each electrical component within the electrical housing unit 210 such that that when the safety pin(s) 214-2 engage or plug into respective apertures of the connector 206-1, the safety circuit 242 de-energizes one or more components within the electrical housing unit 210 so that even if the user decides to open up the electrical housing unit 210, he or she will not be subject to energized live parts but will rather be exposed to de-energized parts. For example, identical to a disconnect switch (except that it is not user actuated), the electrically-controlled switch component 220 may automatically de-energize at least some components within the electrical housing unit 210 in response to the safety pin(s) 214-2 mating with or engaging respective apertures of the connector 206-1. Electrically-controlled switch components are described in more detail herein.

The energy supply component 212 supplies energy or power needed at a device (e.g., the aircraft 102 of FIG. 1) by transmitting the energy through the channels (e.g., wires) 250, 240, through the pin(s) 214-1, and through the cable 206 to a particular device. In some aspects, the energy supply component 212 does not supply the energy until an indication is received (e.g., by the electrically-controlled switch component 220) that the receptacle 214 has engaged (or is engaging with) the connector 206-1 (or more specifically, that the safety pin(s) 214-2 are engaging with respective apertures within the connector 206-1). For example, the electrically-controlled switch component 220 (and/or the energy supply component 212) may include an "AND" (or "OR") gate such that energy is only supplied when the following conditions have been met (or one of the conditions if an "OR" gate is used): the safety pin(s) 214-2 are engaging with respective apertures of the connector 206-1, and a user has requested energy to be supplied via a switch interface (e.g., one of the switch interface(s) 230).

In some aspects, the energy supply component 212 is any suitable component that provides and/or regulates energy or power. For example, the energy supply component 212 can include a 12 VDC power supply at 1.7 amps and/or output power block. In some aspects, the electrically-controlled switch component 220 includes any suitable electrically-controlled switch, such as a contactor and/or a relay.

The electrical housing unit 210 further includes one or more indicators and/or switch interface(s) 230 located on or accessible from an outside surface of the electrical housing unit 210. For example, these can include a volt meter, a hertz meter, a power availability indicator, a contactor closed indicator, a deactivation component, an activation component, as described in more detail herein.

Figure 3A:
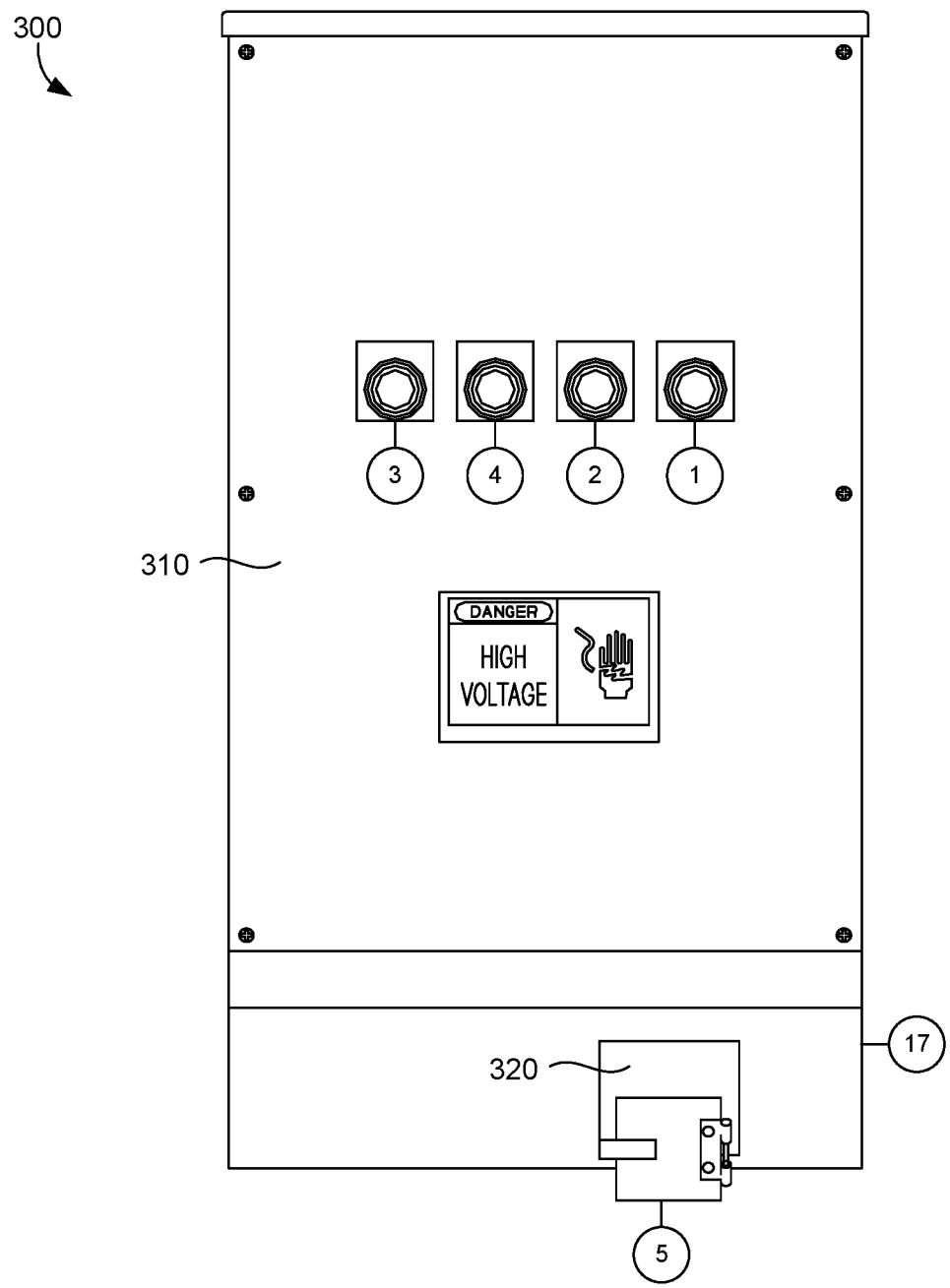
FIG. 3A illustrates a front view of the electrical housing unit of an electrical system enclosure, in accordance with aspects herein.
Figure 3B:
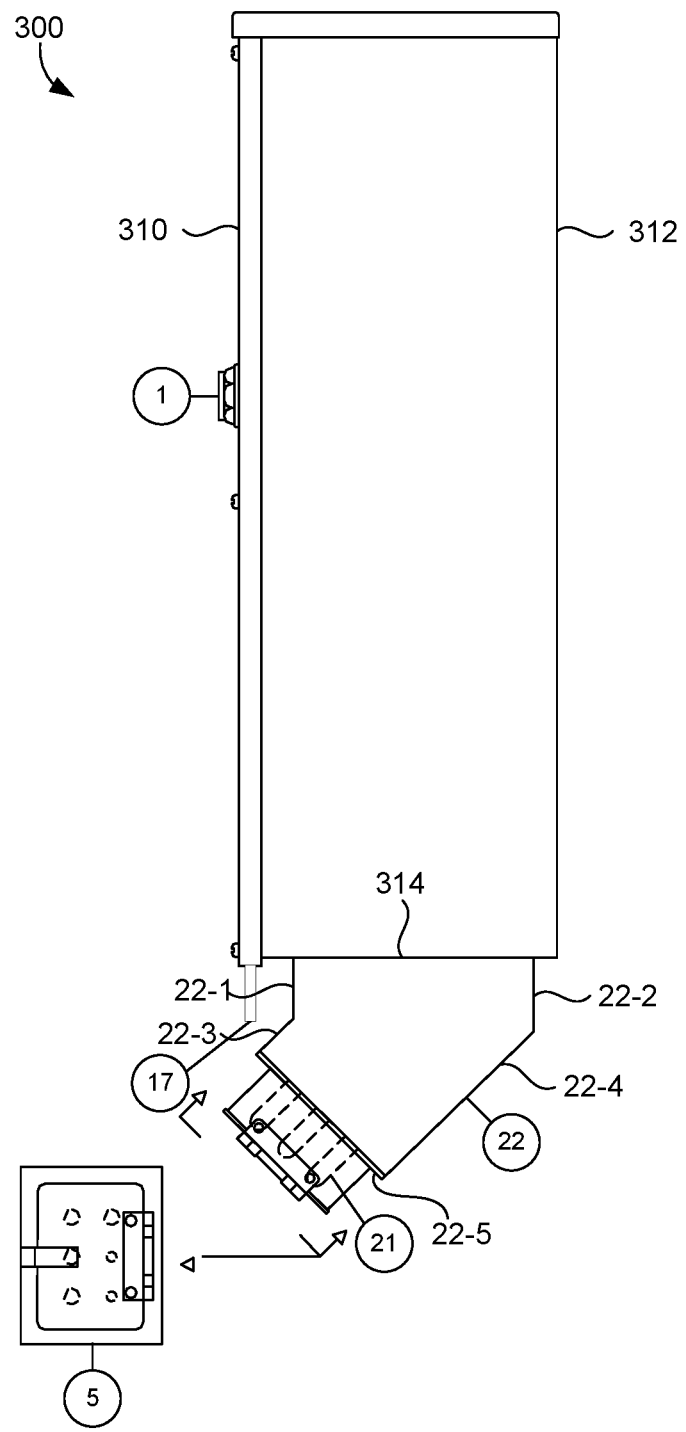
FIG. 3B illustrates a side view of the electrical housing unit of FIG. 3A, in accordance with aspects herein.
Figure 3C:
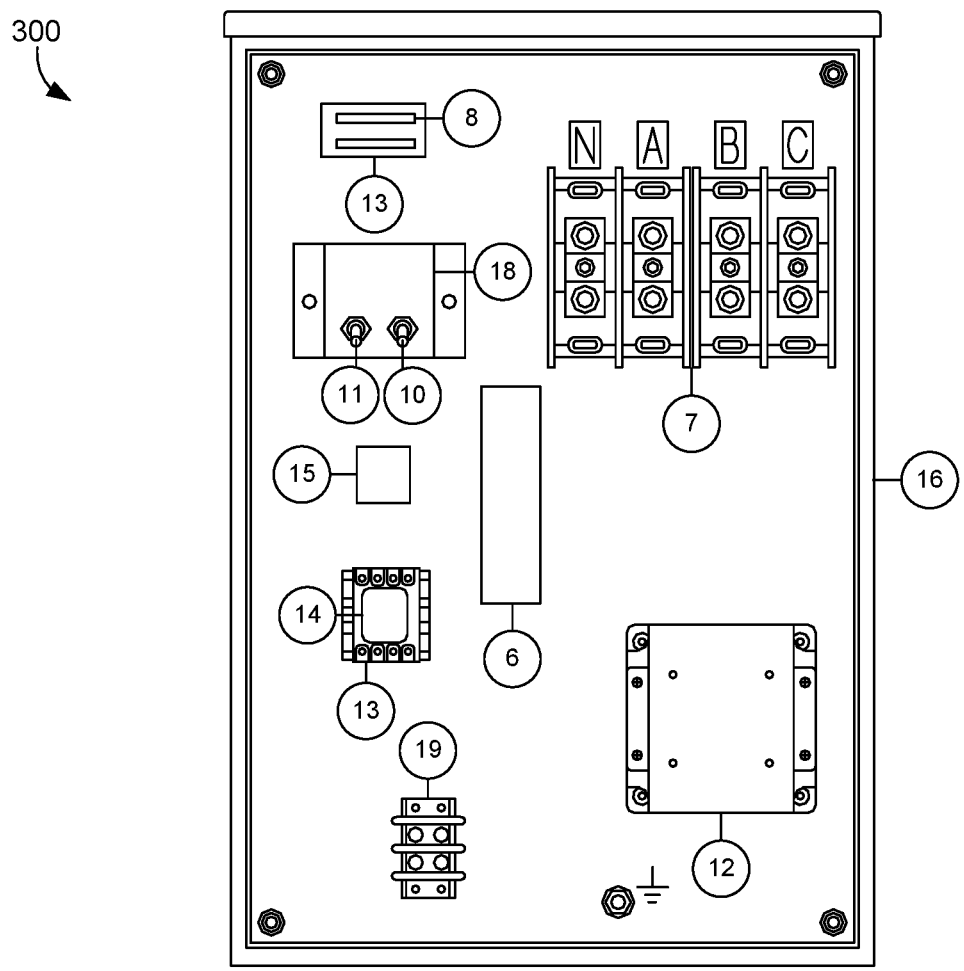
FIG. 3C illustrates an inside view of the electrical housing unit of FIG. 3A showing various electrical components, in accordance with aspects herein.

FIGS. 3A through 3C illustrate different views of an electrical housing unit 300 of an electrical system enclosure, according to some embodiments. In some embodiments, the electrical housing unit 300 represents the electrical system enclosure 110 of FIG. 1 and/or the electrical housing unit 210 of FIG. 2 and vice versa. For convenience and reference, the legend below describes example components for FIGS. 3A, 3B, and 3C. Each "item" in the legend corresponds to a particular electrical component or collection of components that are mere examples and are not limiting, which is also illustrated in FIGS. 3A, 3B, and/or 3C:

| ITEM | DESCRIPTION |
| --- | --- |
| 1 | PUSH BUTTON N.C. RED. OFF |
| 2 | PUSH BUTTON N.O. GREEN. ON |
| 3 | INDICATOR LIGHT, POWER AVAILABLE |
| 4 | INDICATOR LIGHT, CONTACTOR CLOSED |
| 5 | HINGED COVER |
| 6 | 12 VDC POWER SUPPLY. 10 AMPS |
| 7 | OUTPUT POWER BLOCK (2) |
| 8 | FUSE. 1 AMP |
| 9 | FUSE HOLDER |
| 10 | SWITCH. DISABLE |
| 11 | SWITCH. BYPASS |
| 12 | CONTACTOR. SqD |
| 13 | AUXILIARY CONTACTOR RELAY (BASE, DIN) |
| 14 | AUXILIARY CONTACTOR RELAY |
| 15 | RECTIFIER |
| 16 | BACK BOX |
| 17 | BOTTOM ADAPTER |
| 18 | SWTICH BRACKET |
| 19 | E and F TERMINAL BLOCK |
| 20 | MOV |
| 21 | RECEPTACLE |
| 22 | EXTENSION |

FIG. 3A illustrates a front view of the electrical housing unit 300 of an electrical system enclosure, according to some embodiments. FIG. 3A illustrates indicators and switch interfaces located on the outside face surface 310 of the electrical housing unit 300, such as the power available indicator 3, the power on indicator 4, the start button 2, and the stop button 1. In some aspects, the power available indicator 3 emits light (or turns a particular color) (e.g., via a LED) when there is power available to power a particular machine (e.g., the aircraft 102).

In some aspects, the power available indicator 3 is automatically activated (e.g., emits light or a defined spectrum of light) in response to the electrical system enclosure being powered on. Alternatively or additionally, the power available indicator 3 is automatically activated in response to the receptacle 21 plugging into or otherwise engaging a respective connector of a cable (e.g., the connector 206-1). In some aspects, the receptacle 21 includes a first set of prongs (e.g., the pin(s) 214-1) used to activate the power available indicator 3 and a second set of prongs (e.g., the safety pin(s) 21402) to activate a safety circuit (e.g., the safety circuit 242). Additionally, in some aspects the first set of prongs are longer in length relative to the second set of prongs. In this way, when the receptacle 21 engages or otherwise plugs into a connector, because the first set of prongs are longer, they will engage the connector first in time before the second set of prongs, which first triggers the power available indicator 3 to illuminate or otherwise function. Responsively (and later in time), the second set of prongs will engage the connector and mate with the safety circuit, thereby activating (e.g., closing) the safety circuit, which energizes the contactor 12, thereby allowing energy to be delivered to a load (e.g., the aircraft 102) and/or the entire electrical system enclosure becomes energized. In some embodiments, activating the safety circuit alternatively or additionally de-energizes the electrical housing unit 300 itself and/or some electrical components contained therein. This allows an operator to freely and safely touch the "start" button 2 or otherwise touch any portion of the electrical housing unit 300 without having to open the electrical housing unit 300 or be subject to electrical shock.

As described herein, in some situations, one or more wires or other electrical components within the electrical housing unit 300 may experience a fault, which may inadvertently energize the electrical housing unit 300 itself, thereby exposing operators to potential electric shock. For example, if a wire's sheath wears away such that a bare metal portion of the wire touches a conductive portion of the electrical housing unit 300, this could energize the entire electrical housing unit 300, including the outside face surface 310 of the electrical housing unit 300. Consequently, if an operator tries to touch any buttons or other features of the electrical housing unit 300, she would experience electric shock. Accordingly, it is desirable in some aspects to first de-energize one or more components of the electrical housing unit 300 before the user touches or interfaces with the electrical housing unit.

In some aspects, although not shown, the outside face surface 310 further includes one or more buttons (e.g., that have limited to no conductive properties) or switch interfaces that are configured to transmit an operator de-energize request signal to de-energize one or more components of the electrical housing unit 300 and/or electrical components contained therein. In this way, instead of (or in addition to) the receptacle 21 including safety pins to close a safety circuit to energize any component therein, this same safety circuit (e.g., safety circuit 242) can be opened in response to receiving an operator request via a push button or switch activation from the outside face surface 310 of the electrical housing unit 300 to de-energize one or more electrical components. Accordingly, unlike conventional electrical system enclosures, the operator does not have to open a door or panel to engage a disconnect switch, as described herein. Rather, the operator can easily de-energize an electrical system enclosure directly from the electrical housing unit 300 without having to expose themselves to electrical components by opening up a door or panel.

The start button 2 is a switch interface that closes a switch to trigger the contactor 12 (e.g., the electrically-controlled switch component 220) to close (i.e., activate or energize). This contactor 12 closing triggers actual energy or power to be transferred to a load, such as machine (e.g., the aircraft 102). Specifically, in response to receiving an indication (e.g., a signal) of an operator request to supply power via the start button 2, a signal is transmitted through the relays 13 and 14. This causes the contactor 12 to be closed via power through the rectifier 15. And once the contactor 12 is closed, energy or power can then be transferred to a device, as described, for example, with respect to FIG. 1. These components of FIG. 3C are described in more detail below.

In some aspects, in order for the start button 2 to be activated (and/or the contactor 12 to be energized), an "AND" gate (e.g., within the electrically-controlled switch component 220 of FIG. 2) is traversed requiring multiple TRUE conditions. For example, some aspects require a receiving of an indication of push button request via the start button 2 and the power available indicator 3 must be TRUE or activated, which means that the safety circuit must have been activated (e.g., closed) before the contactor 12 is energized. This means that in some aspects, before a device (e.g., the aircraft 102) can actually be provided power, a connector of a cable must be plugged into the receptacle 21, there must be power available to power a device (as indicated by the power available indicator 3), and the safety pins must have activated a safety circuit. In response to these conditions being met, the flow of energy or current to power the device is triggered. In some aspects, this means that the previous non-energized state of one or more electrical components changes into an energized state so that the energy can be transferred. In some aspects, in response to the start button 2 being pushed, it activates by emitting a green light indicating that it has been pushed.

In response to the contactor 12 being energized, particular aspects automatically cause the power on indicator 4 to activate (e.g., emit light and/or emit an auditory sound). This indicates that the contactor 12 has been closed and that energy or current can responsively (or continue to) be transmitted (e.g., to the aircraft 102). The power on indicator 4 also indicates to an operator that energy is (or is about to be) transferring from the electrical system enclosure to a load, such as a machine.

The stop button 1 is configured to open the contactor 12 (which was previously in a closed position based on the start button 2 being pushed) such that energy is no longer supplied to the target load (e.g., the aircraft 102) in response to an operator push of the stop button 1. In this way, for example, when the operator desires to no longer provide power to a machine, he or she may then push the stop button 1 to stop the flow of current to the machine and responsively remove a cable from the receptacle 21. In some aspects, in response to the stop button 1 being pushed, it turns a particular color, such as red. In this way, for example, prior to the stop button 1 being pushed, the start button 2 may emit a green color but responsive to the stop button 1 being pushed, the start button color may change or stop emitting and the stop button 1 may responsively emit the red color. In this way, the operator clearly knows when power is being supplied and when it is not being supplied.

It is understood that although the start button 2 and the stop button 1 are illustrated as being mechanical in nature, these may alternatively be digital or take the form of touch screen switch interfaces such that when a user touches these features (or performs a particular finger gesture (e.g., a pinching of fingers)), the respective functionalities are performed. Likewise, it is understood that although the power available indicator and the power on indicator 4 are described in terms of light emitting, the indicators can provide indications to the operator in additional or alternative methods, such as auditory alarms or warnings or other indications.

In some aspects the bottom adaptor 17 is a panel or article of manufacture that is substantially parallel to (or oriented in a planar fashion relative to) the outside face surface 310. The aperture 320 defines an opening to the bottom adaptor 17. The hinged cover 5 is configured to be placed within the aperture 320 and fit over the receptacle 21, as illustrated in FIGS. 3A and 3B. The hinged cover 5, as well as the bottom adaptor 17 has utility in that it provides a shielding mechanism from weather elements (e.g., rain or snow) or other elements (e.g., bugs) from entering into or affecting the receptacle 21 or extension 22 when mounted in an intended vertical orientation.

In some embodiments, the electrical housing unit 300 (and/or any electrical housing unit described herein) is made of stainless steel, which may be applicable for environments with salt air and/or where corrosive chemicals are present. Alternatively or additionally, the electrical housing unit is made from other materials, such as polymers, carbon steels, aluminum, chromium coating, and/or other metal/plastic.

FIG. 3B illustrates a side perspective view of the electrical housing unit 300, according to some embodiments. FIG. 3B illustrates the front outside face surface 310, as well as the rear surface 312, and a bottom surface 314 (which are all "outside surfaces" because they define the outside boundary enclosing a volume of space containing one or more electrical components of the electrical housing unit 300). FIG. 3B illustrates that the extension 22 (which collectively includes the edges 22-1, 22-2, 22-3, 22-4, and 22-5) (e.g., the extension 216 of FIG. 2) is coupled to or extending from the bottom surface 314 at a first end (that includes the edges 22-1 and 22-02), and protrudes or juts out at a second end (that includes the edges 22-3 and 22-4). The receptacle 21 is coupled to or extends from the bottom surface 22-5 of the extension 22 with the respective prongs or pins of the receptacle 21 extending outward.

As illustrated in FIG. 3B, in some aspects the extension 22 is oriented from about ~20 degrees to about ~60 degrees (e.g., substantially 45 degrees). Specifically, the edges 22-1 and 22-2 are substantially planar or parallel to the outside face surface 310 and the rear surface 312. However, the edges 22-3 and 22-4 are oriented at substantially 45 degrees relative to the edges 22-1 and 22-2 (and relative to the surfaces 310 and 312).

This angled (e.g., 45 degree) orientation has utility in situations where cable connectors are left connected in the receptacle 21 while the cable having the cable connector is pulled or otherwise repositioned so that the electrical housing unit 300 does not tear away from a wall (e.g., the wall 112) or any other mounting surface while the cable is pulled or otherwise repositioned. In an illustrative example, in response to the stop button 1 being pushed to stop the energy flow between the electrical housing unit 300 and a truck (e.g., that is connected by the cable 106), an operator may be in a hurry and may forget to disengage the connector 206-1 of FIG. 2 from the receptacle 214. Accordingly, when the operator drives the truck with the connector 206-1 still connected, the connector 206-1 will more easily disengage the receptacle 214 as a result of the angular orientation relative to a non-angular orientation to the electrical housing unit. This is, in part, based on the cable 206 having more degrees of freedom and a better orientation for disengagement or experience less opposing forces (by the receptacle 214) having the angular orientation relative to the receptacle 214 being oriented parallel to the edge 22-1. For example, suppose that the extension 22 only had edges 22-1 and 22-2 (and not edges 22-3 and 22-4) and a bottom surface connected these two edges 22-1 and 22-2 such that the extension 22 (and the receptacle 21) would extended in a downward and parallel fashion with respect to a vertical length of the outside face surface 310 and the rear surface 312. If the operator drove off, the receptacle 21 (now being oriented directly downward in the provided hypothetical) would provide higher opposing forces to a cable connector if the cable experienced torsion and/or lateral tension forces due to the truck laterally pulling away and the receptacle 21 now pointing downward. These opposing forces by the receptacle 21 may cause the electrical housing unit 300 to be completely disengaged to a mounting surface, such as a wall or cart.

FIG. 3C illustrates an inside view of the electrical housing unit 300 showing various electrical components, according to some embodiments. The output power block 7 splits a primary power cable or source into secondary circuits or wires—A, B, C, and N—that will supply the energy, via a power supply 6 (e.g., the energy supply component 212 of FIG. 2) to a device or machine load (e.g., the aircraft 102 of FIG. 1). Wires A, B, and C represent live wires and N represents a neutral wire. The neutral wire N ties into a neutral block (now shown) and the wires A, B, and C tie (e.g., form an electrical connection) into the contactor 12 to close the contactor 12 (e.g., as described above in response to a push of the start button 2) such that the contactor 12 is energized. Wires A, B, and C further tie into or traverse through the extension 22 and further tie into the receptacle 21 such that when an operator plugs in a connector to the receptacle 21, a control signal can be transmitted through circuitry to energize the contactor 12, as described herein.

The E and F terminal block 19 represent a block of wires that tie into the safety pin(s) (safety pin(s) 214-2 of FIG. 2) to activate a safety circuit (e.g., the safety circuit 242 of FIG. 2), which is described in more detail below. As described above, the rectifier 15 (converts alternating current to direct current) provides converted power or current to the contactor 12. The bypass switch 11 is a mechanical switch that operators, such as technicians, can activate in order to service one or more electrical components without disrupting power to the load or machine (e.g., the aircraft 102) such that maintenance operations can be performed without power disruptions. Therefore, the bypass switch 11 adds redundancy to power systems of electrical system enclosures. The disable switch 10 is connected to the same switch bracket 18 as the bypass switch 11 and disables the bypass operation.

The components and elements depicted and discussed in connection with FIGS. 3A-3C are examples and non-limiting. It is contemplated that alternative, additional, or omitted items may be used on practice. Any number, type, size, and configuration of elements may be used or substituted beyond what is explicitly depicted in connection with FIGS. 3A-3C.

Figure 4:
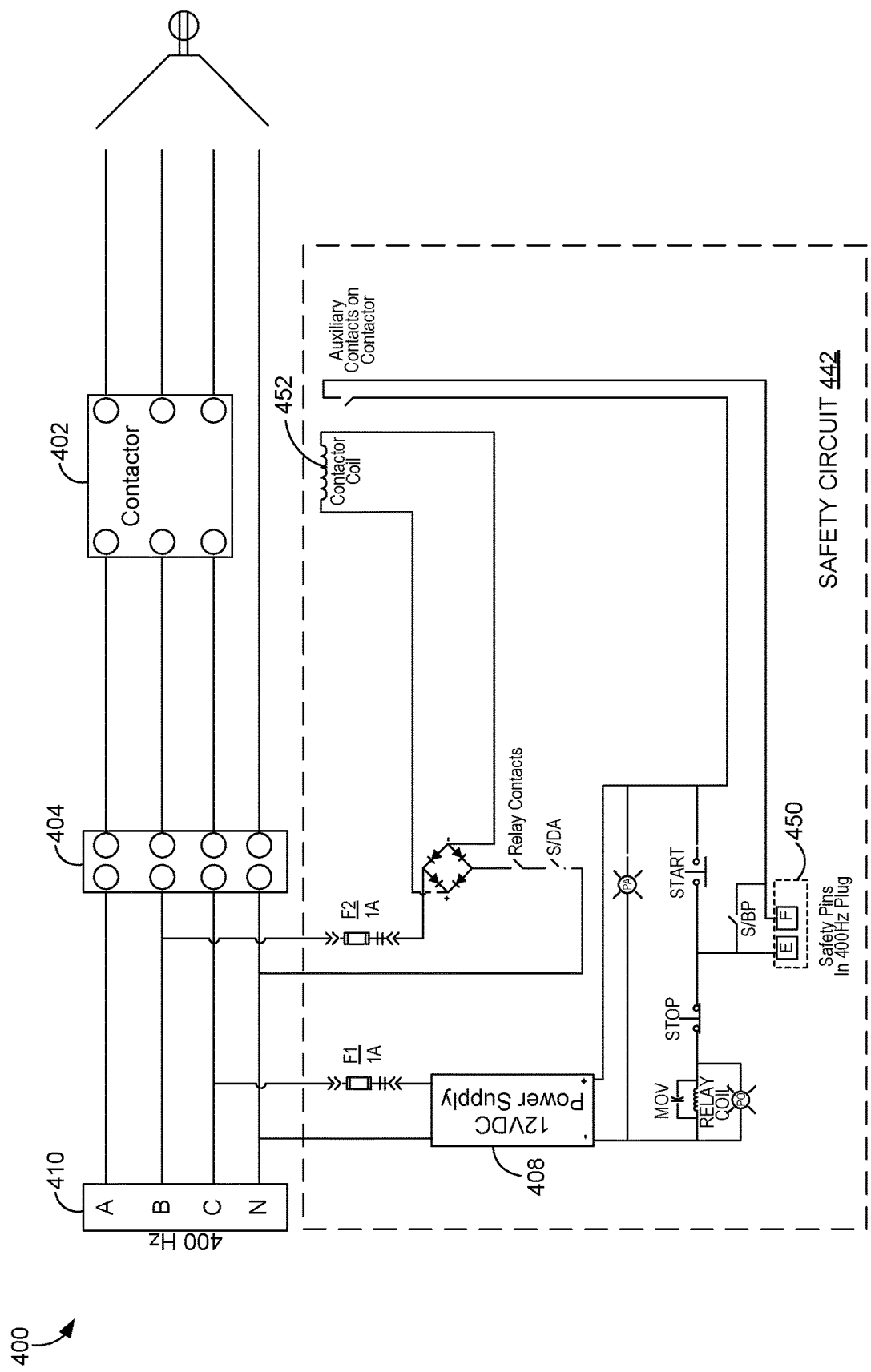
FIG. 4 is a schematic diagram illustrating how a contactor is energized via a safety circuit, in accordance with aspects herein.

FIG. 4 is a schematic diagram illustrating how a contactor 402 is energized via a safety circuit 442, according to particular embodiments. In some aspects, the safety circuit 442 represents the safety circuit 242 of FIG. 2 and vice versa or any other safety circuit described herein, such as with respect to FIGS. 3A through 3C. In some aspects, FIG. 4 represents circuitry located within the electrical housing unit 210, and/or FIGS. 3A through 3C in order to supply energy to power a device or machine.

The set of wires 410 include wires A, B, and C, which tie into a power block 404 and further tie into a contactor 402 to energize (or close) the contactor 402 when power is supplied via the power supply 408 and when the contactor coil 452 of the safety circuit 442 is energized. Energizing the contactor 402 activates or triggers current flow or energy transfer out of respective pins corresponding to wires A, B, C to a load (e.g., via a cable), such as a particular machine (e.g., the aircraft 102 of FIG. 1). Wires A, B, and C represent live wires, whereas wire N represents a neutral wire that ties into a neutral block. In some embodiments, each of these components—the set of wires A, B, C, N, the contactor 402, and the power block 404 represent the circuit 240 of FIG. 2 and vice versa. In some aspects, the power block 404 represents the power block 7 of FIG. 3C and vice versa. Likewise, in some aspects the contactor 402 represents the contactor 12 of FIG. 3C and vice versa.

FIG. 4 also illustrates the safety circuit 442 that is configured to energize the contactor 402. As illustrated in the schematics of the safety circuit 442, there are 2 pins E and F that are together labeled 450. In various aspects, each of the wires A, B, C, and N each also formulate individual pins, thereby making a total of 6 pins (4 pins coming from wires A, B, C, and N and 2 safety pins forming respective wires) that formulate a receptacle (e.g., the receptacle 214 of FIG. 2 and/or the receptacle 21 of FIG. 3B), where each of the 6 pins are configured to engage a connector (e.g., the connector 206-1 of FIG. 2) by being plugged into respective 6 apertures (e.g., secured with mechanical/friction fit). The safety circuit 442 also illustrates that no power is supplied by the power supply 408 in order to energize the contactor 402 unless and until the safety circuit 442 has been closed (e.g., based on a mate with a receptacle). In some embodiments, the power supply 408 represents the power supply 6 of FIG. 3C and vice versa.

While FIG. 4 depicts 400 Hz as a frequency associated with the set of wires 410, it is contemplated in alternative examples that the wires 410 may be associated with any frequency of energy, such as 50 Hz or 60 Hz.

Figure 5A:
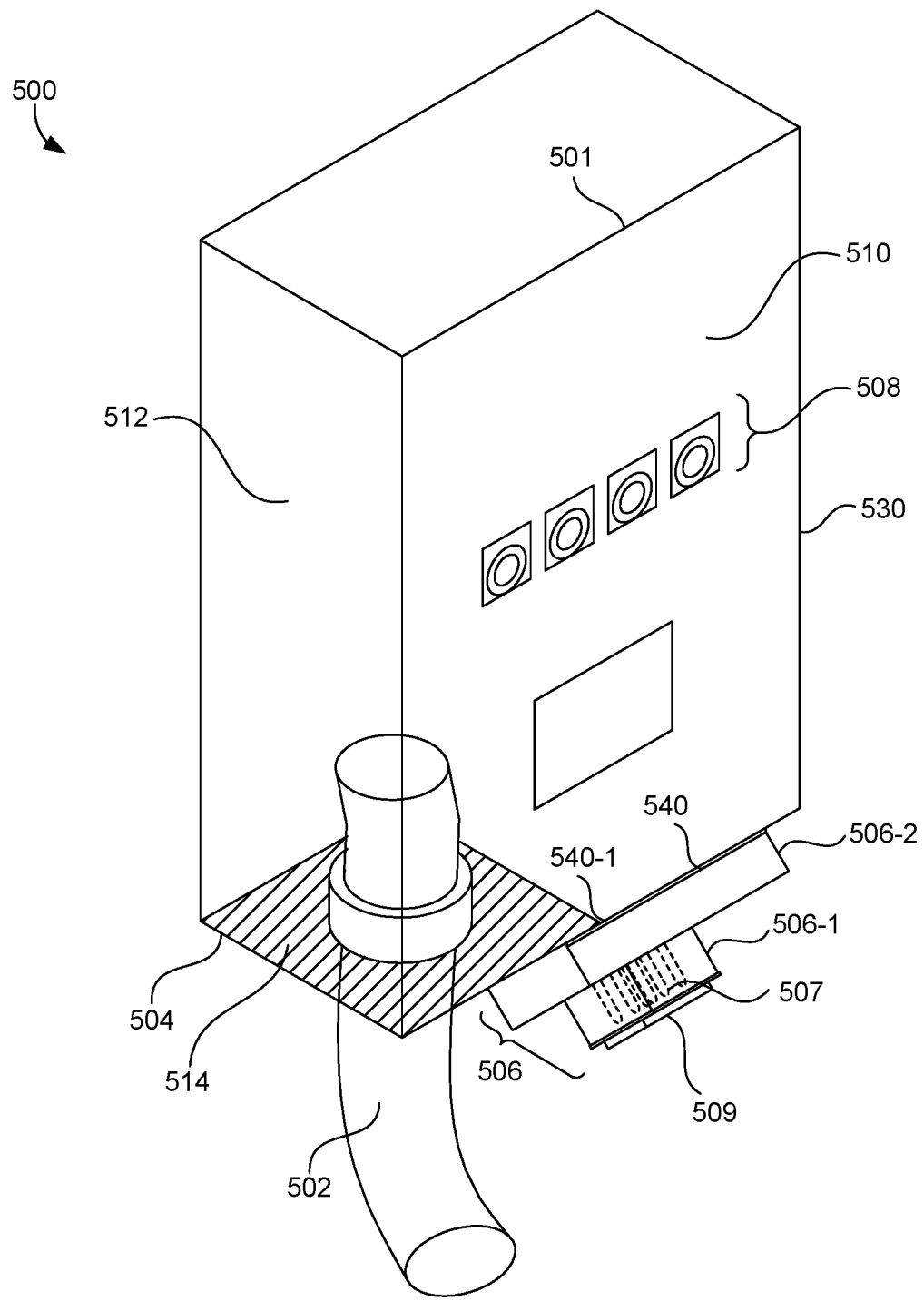
FIG. 5A is illustrates a front view of an electrical system enclosure, in accordance with aspects herein.
Figure 5B:
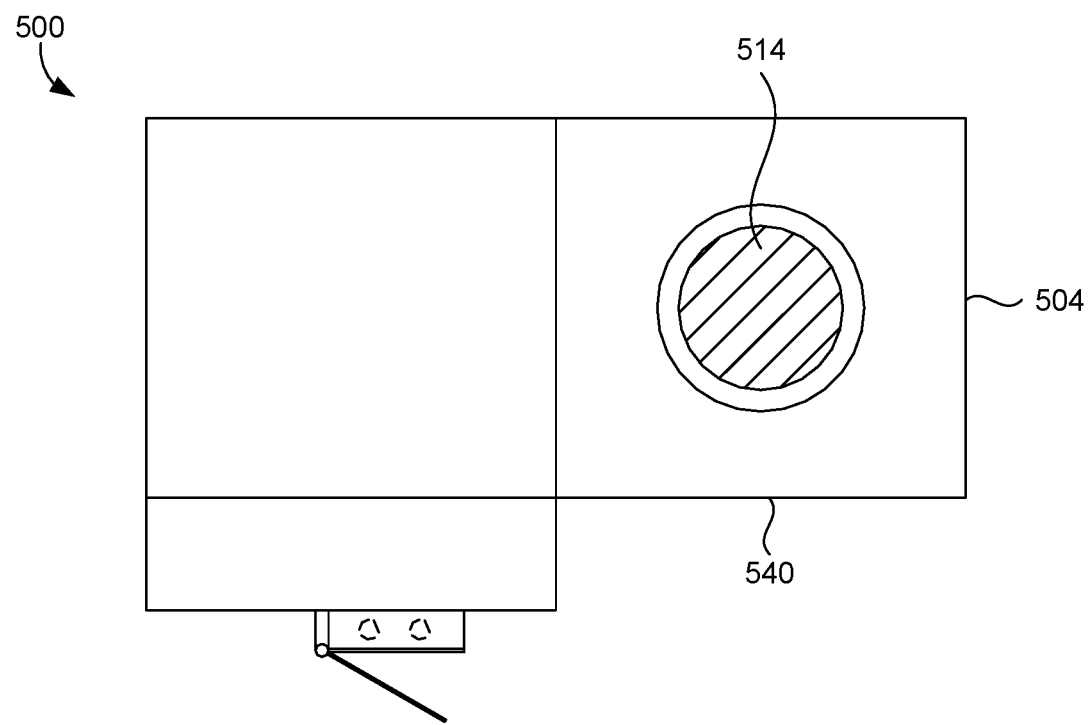
FIG. 5B illustrates a bottom view of the electrical housing unit of FIG. 5A, in accordance with aspects herein.

FIGS. 5A through 5B illustrate an electrical system enclosure with a recessed extension to allow power input to be fed directly into the bottom of the electrical system enclosure, according to particular embodiments. FIG. 5A is illustrates a front view of an electrical system enclosure 500, which includes a recessed extension 506 and a power input cable 502. In some embodiments, the electrical system enclosure 500 represents or includes the electrical housing unit 210 of FIG. 2 and/or 300 of FIG. 3, except with a few modifications, as described below.

As illustrated in FIG. 5A, the extension 506 is shortened in a transverse/horizontal direction of the electrical system enclosure 500. The extension 506 includes components 506-1 and 506-2. Component 506-1 extends horizontally across the bottom edge 540 of the front face 510 of the electrical housing unit 501 until it reaches the point 540-1, which is about midway across the bottom edge 540. In some embodiments, the extension 506 represents the extension 22 of FIG. 3B. The conduit 514 at least partially defines an opening between the bottom edge 540 and the side edge 504 so as to allow the power input (e.g., in Hertz), via the power input cable 502, to enter within the electrical system enclosure 500. The receptacle 507 (e.g., the receptacle 214 of FIG. 2 or the receptacle 21 of FIG. 3B) 560 is situated inside the component 506-1, and is covered via the cover 509 (e.g., the hinged cover 5 of FIG. 3B). In some embodiments, the power input is proved to the electrical system enclosure 500 so that the electrical system enclosure can provide, via a frequency converter (e.g., and through the cable 106), the necessary output power required by particular large loads (e.g., aircraft).

As illustrated in FIG. 5A, the power input cable 502 is housed within the electrical housing unit 501 and is accessed through the conduit 514. This allows the power input cable 502 to enter the electrical housing unit 501 directly at the bottom of the electrical housing unit 501. This configuration has utility when there is an obstruction (e.g., a construction beam or column) near the face 510 or any other portion of the electrical system enclosure 500 where the power input cable 502 would be restricted had the power input cable 502 been located outside of the electrical housing unit 501 on a different surface.

FIG. 5A also illustrates switch interfaces and/or indicators 508 on the face surface 510. These components can function identical to any of the corresponding components described herein, such as the indicator(s)/switch interface(s) 230 of FIG. 2, the power available indicator 3, the power on indicator 4, the start button 2, and/or the stop button 1 of FIG. 3A, for example.

FIG. 5B illustrates a bottom view of the electrical housing unit 501, which illustrates the conduit 514 relative to the edges 504 and 540 and also illustrates how the power input cable 502 may enter and interior volume of the electrical housing unit 501.

Figure 6:
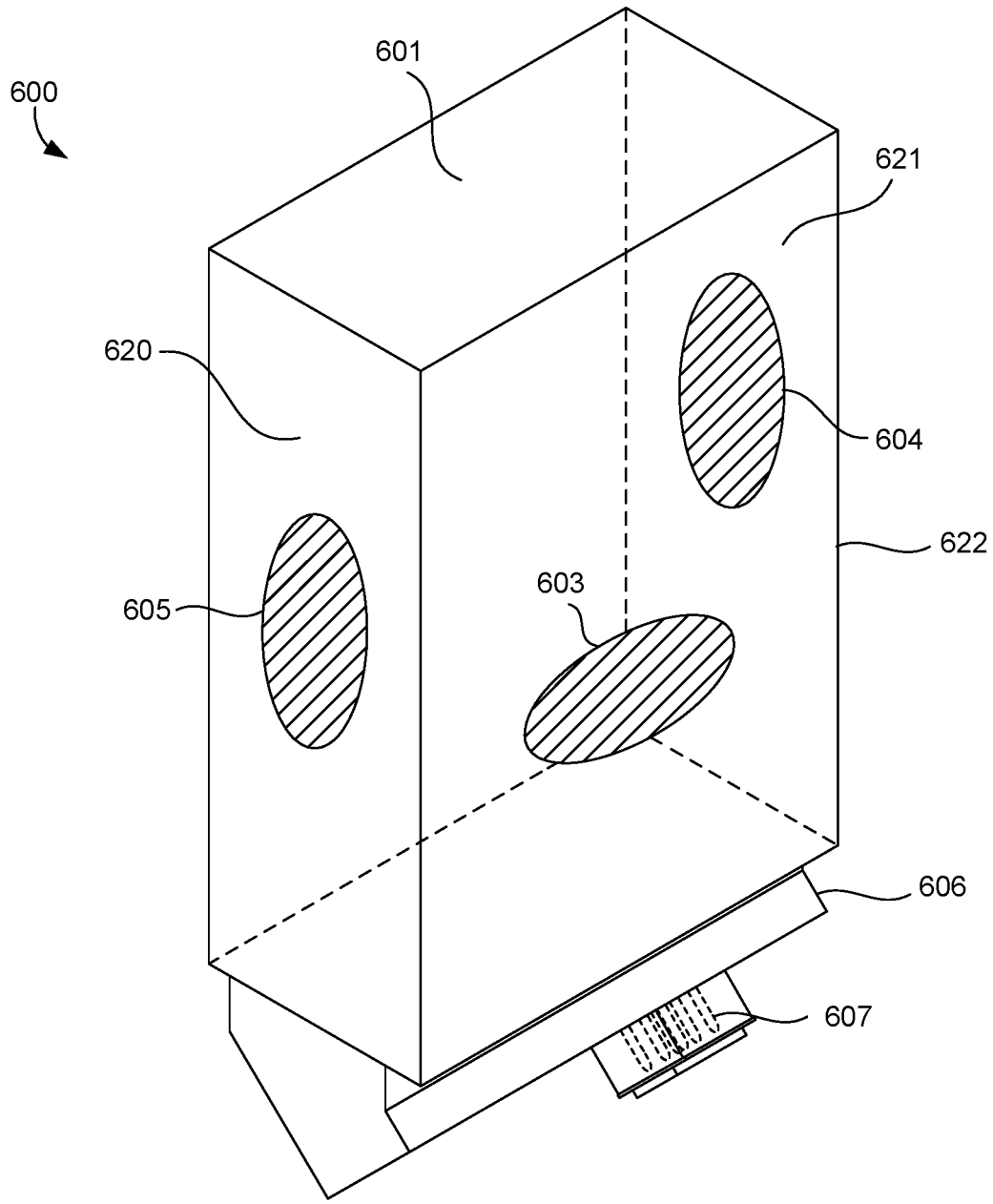
FIG. 6 illustrates a front perspective view of an electrical system enclosure, which shows that power input cables or receptacles can be placed in various position across an electrical housing unit, in accordance with aspects herein.

FIG. 6 illustrates a front perspective view of an electrical system enclosure 600, which indicates that a power input cable (e.g., the power input cable 502) or a receptacle (e.g., the receptacle 21) can be placed in various position across an electrical housing unit, according to some embodiments. Even though FIG. 6 illustrates the extension 606, which is coupled to the receptacle 607, it is understood that the receptacle 607 can be located in various positions (e.g., 605, 603, or 604). An electrical housing unit 601 includes locations or conduits 603, 604, and 605 that define openings within a respective portion of the electrical housing unit 601 and which illustrate that a power input cable can be placed at 603, 604, or 605. In some aspects the identifiers 605, 603, and 604 alternatively (or additionally) represent receptacles (e.g., receptacle 214 of FIG. 2, receptacle 21 of FIG. 3B) themselves such that receptacles are directly attached, coupled, and/or extending to/from the respective outside surface portions of the electrical housing unit 601 (as opposed to being located on the bottom of the electrical housing unit 601 as illustrated in FIG. 6). In some embodiments, although three different conduits/locations 603, 604, and 605 are illustrated as being on the same electrical housing unit 601, in some embodiments, the electrical housing unit 601 contains more or fewer conduits/locations. For example, in some aspects, the electrical housing unit 601 only includes the conduit/location 603 and not the conduit/locations 604 and 605. In some embodiments, one or more extensions (e.g., extension 216 of FIG. 2 or 22 of FIG. 3B) are configured to be placed at locations corresponding to 605, 603 and/or 604 such that a respective receptacle can be coupled to the extension in any location on an outside surface of the electrical housing unit 601 (i.e., the face 621, the side surface 620, or the side surface 622).

In some embodiments, the electrical system enclosure 600 represents or includes components (e.g., electrical components/circuits) within the electrical housing unit 210 of FIG. 2, 300 of FIG. 3, and/or the electrical housing unit 501, except with a few modifications, as described below.

The electrical housing unit 601 includes a side surface 620 that includes the conduit/location 605. The face surface 621 includes the conduit/location 603. The side surface 622 includes the conduit/location 604. This illustrates that a conduit, power input cable, or receptacle can be placed in any suitable position on a particular electrical housing unit (e.g., rather than just on an extension, as illustrated in FIG. 2 and FIG. 3B, or the bottom of an electric housing unit, as illustrated in FIGS. 5A and 5B). Such placement may be desirable to accommodate the installation dynamics or the environment, such as potential obstacles surrounding one or more sides of the electrical housing unit 601. In this way, for example, if the conduits/locations 603 and 604 are covered by an obstacle, then conduit/location 605 can be used to engage a connector with a respective power input cable or receptacle.

Figure 7:
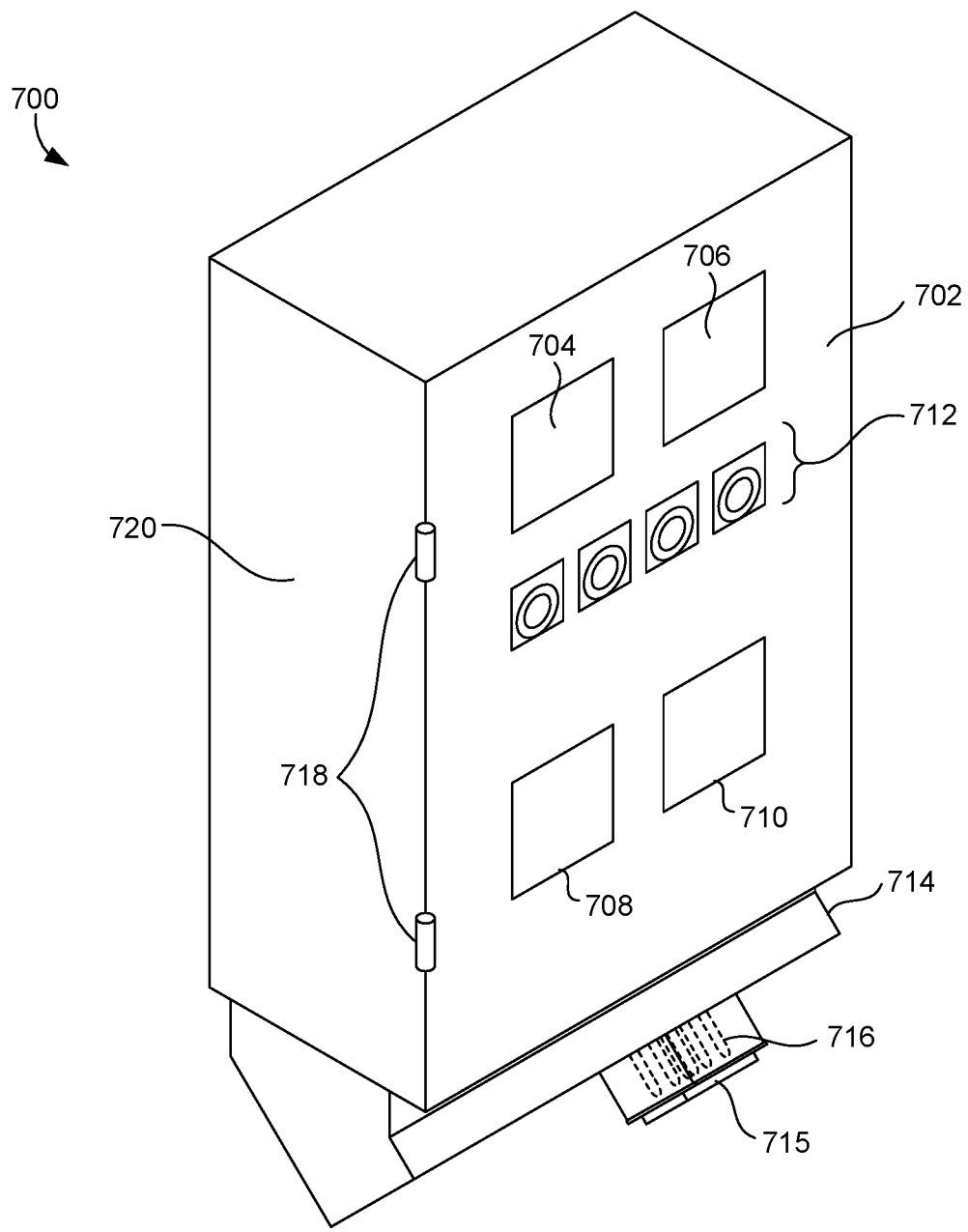
FIG. 7 illustrates a front perspective view of an electrical system enclosure showing different indicators that can be placed at a face surface of the electrical housing unit of the electrical system enclosure, in accordance with aspects herein.

FIG. 7 illustrates a front perspective view of an electrical system enclosure 700 that illustrates different indicators that can be placed at the face surface 702 of the electrical housing unit 701 of the electrical system enclosure. In some embodiments, the electrical system enclosure 700 represents or includes components (e.g., electrical components/circuits) within the electrical housing unit 210 of FIG. 2, 300 of FIG. 3, the electrical housing unit 501 of FIG. 5, and/or the electrical housing unit 601 of FIG. 6, except with a few modifications, as described below.

A face surface 702 includes a voltage meter 704, a hertz meter 706, a safety circuit meter 708, and a lockout/tagout performed meter/indicator 710. Although the face surface 702 is illustrated as containing each of these meters, in some aspects more or fewer meters/indicators may be present than illustrated. For example, there may only be a hertz meter on the face surface 702 in some embodiments.

The voltage meter 704 is an indicator that indicates the amount of voltage running through one or more components of the electrical system enclosure 700. For example, the voltage meter 704 can include a component connected downstream from the contactor 402 on the wires A, B, and C illustrated in FIG. 4 so that it captures the voltage that is outputted after the contactor 402 has been energized. In some embodiments, however, the electrical system enclosure 700 can alternatively or additionally include voltage meter that measures input voltage (e.g., the amount of voltage running through the wires A, B, and C before the contactor 12 is energize). For example, the voltage meter can measure input voltage of if power coming from the input cable 502 into the electrical system enclosure 500. The voltage meter 704 may be useful for technicians who need the electrical system enclosure 700 and its components to be de-energized before inspecting any portion of the electrical system enclosure 700. In this way, the operator does not have to open a door, panel, or otherwise peer into the inside of the electrical system enclosure 700. In some embodiments, the inside of the electrical system enclosure 700 (e.g., as illustrated in FIG. 3C) includes any suitable voltage tester/detector, such as a voltmeter to test the electrical potential difference between two points, the output of which is rendered at the voltage meter 704.

The voltage meter 704 may also be useful for operators who desire the electrical system enclosure 700 and its components to be de-energized before plugging in a connector to a receptacle to power a load. In some embodiments, in response to a safety circuit being activated (e.g., the safety circuit 242 of FIG. 2), the voltage detector causes the voltage meter 704 to display corresponding results indicating an energized or de-energized state of any component of the electrical system enclosure 700. This gives indications to the operator whether he or she can touch or engage with any components, such as switch interfaces included in the set 712.

Similarly, the safety circuit meter 708 can indicate whether the safety circuit has been engaged, which in some aspects is indicative of the safety pin(s) (e.g., safety pins 214-2 of FIG. 2) successfully mating with or engaging a connector (e.g., the connector 206-1 of FIG. 2) and/or safety circuit in order to energize a contactor and/or other components within an electrical system enclosure 700. This not only useful to indicate to operators when they can touch or otherwise interface the electrical system enclosure 700 (e.g., to touch the start button 2 of FIG. 3A), but also gives insight as to why power is not being supplied to a load (e.g., the aircraft 102 of FIG. 1). As described herein (e.g., in connection with FIG. 4), some aspects require that the safety pins engage first before a contactor is energized to allow wires to transfer energy to power a device. Accordingly, in some situations there may be no power going to a load but operators may be uncertain as to why. One way to troubleshoot and rule out certain factors causing power not to be supplied is looking at the safety circuit meter 708. If the safety circuit meter 708, for example, is not flashing or otherwise indicating that a safety circuit has not been activated, this may mean that the set of safety pins are not fully engaging a connector or safety circuit. Alternatively or additionally, this may mean that the electrical system enclosure 700 does not have the power available (e.g., via the power available indicator 3) to power the load since in some aspects, this is a required condition to power a device as described herein. Alternatively, if the safety circuit meter 708 is flashing or otherwise indicating that a corresponding safety circuit is activated, the operator can be assured that the safety pins are properly engaging the respective connector points and/or there is enough power available to supply the load but that there is a problem somewhere else, such as the connections of the pin(s) 214-1 of FIG. 1.

The hertz meter 706 is an indicator that indicates the frequency (hertz) of one or more period electrical signals traversing through the electrical system enclosure 700. For example, the hertz meter 706 can include a component connected downstream from the contactor 402 on the wires A, B, and C illustrated in FIG. 4 so that it captures the frequency that is outputted after the contactor 402 has been energized. In some embodiments, however, the electrical system enclosure 700 can alternatively or additionally include a hertz meter that measures input frequency (e.g., the frequency running through the wires A, B, and C before the contactor 12 is energized). The hertz meter 706 may be useful for operators who desire to see whether the appropriate frequency, during energy transmission, is being outputted through the receptacle to a device outside of the electrical system enclosure 700. As described herein, certain loads, such as aircrafts, for example, require 400 Hz. If the hertz meter 706 indicates that the frequency is only operating at 50 or 60 Hz, the operator may see that she needs to input and run a converter to reach the 400 Hz frequency. The hertz meter 706 may be embodied by any suitable frequency meter, such as a vibrating-reed frequency meter or the moving-disk frequency meter. In some aspects an energy supply component (e.g. the energy supply component 212 of FIG. 2) supplies a frequency of at least substantially 400 Hz (e.g., between ~380 Hz and ~420 Hz), and even greater frequencies, such as around 500 Hz to meet the power requirements of large loads, such as aircrafts.

The face surface 702 also includes the switch interface(s)/indicator(s) 712, which may be any switch interface and/or indicator described herein, such as the indicator(s)/switch interface(s) 230 of FIG. 2, the power available indicator 3, the power on 4, the start button 2, and/or the stop button 1 of FIG. 3

The electrical system enclosure 700 also includes the tension hinges 718, which are coupled to the face surface 702 and the side surface 720 of the electrical housing unit 701. The tension hinges 718 support an electrical system enclosure door defined by the face 702 when the door is in an open position so as to support maintenance of the electrical system enclosure 700 and the electrical components contained therein.

The electrical system enclosure 700 also includes the extension 714 that includes the receptacle 716. In some aspects the extension 714 is identical to the extensions described with respect to the extension 22 of FIG. 3A, the extension 506 of FIG. 5A, and/or the extension 606 of FIG. 6. The electrical system enclosure 700 also includes a cover 715. In some aspects, the cover 715 is identical to the cover 5 as described with respect to FIG. 3A and FIG. 3B such that it is configured to fit between a corresponding aperture and over the receptacle 716 (e.g., the receptacle 214 of FIG. 2).

Figure 8:
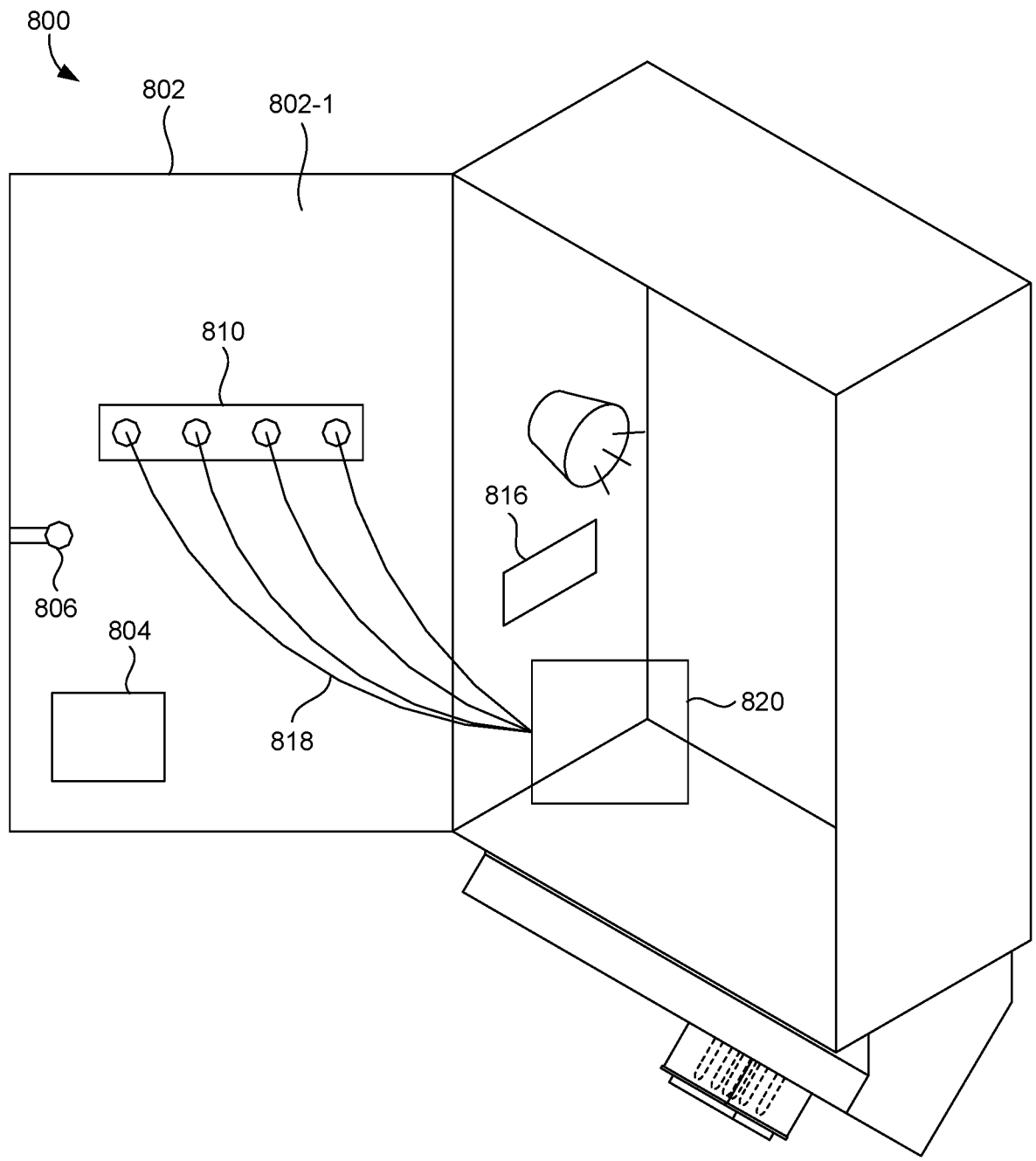
FIG. 8 illustrates an inside view of an electrical housing unit showing various access methods and alarms, in accordance with aspects herein.

FIG. 8 illustrates an inside view of an electrical housing unit 800 showing various access methods and alarms, according to particular embodiments. FIG. 8 illustrates various features that may be useful for maintenance operators or operators otherwise engaging in inspection of an electrical system enclosure. In some aspects, the electrical housing unit 800 represents or includes components (e.g., electrical components/circuits) within the electrical housing unit 210 of FIG. 2, 300 of FIG. 3, the electrical housing unit 501, the electrical housing unit 601, and/or the electrical housing unit 701 of FIG. 7, except with a few modifications, as described below.

The electrical housing unit 800 includes the door 802 and a rear surface 802-1 of the door 802, which includes a rear view of the indicators and/or switch interfaces (e.g., the indicator(s)/switch interface(s) 230 of FIG. 2 or FIG. 3A), and which are tied to leads or wires 818 communicatively connecting each of the indicators and/or switch interfaces 810 to a common terminal or block 820 (e.g., the power block 7 of FIG. 3A) so that each indicator can be provided to a front surface (e.g., the face surface 702 of FIG. 7) of the door 802 and/or each switch indicator request can be communicated, via a signal, to one or more electrical components (e.g., the components described by the inside view of FIG. 3C).

The rear surface 802-1 also includes a rear view of multiple access interfaces 806 and 804, which both provide access to the internal electrical components within the electrical housing unit 800 via the door 802. Access interface 806 illustrates a mechanical locking/unlocking mechanism that unlocks the door 802 in response to a tangible key or other actuation device physically engaging a key hole of the access interface 806. Access interface 804 illustrates a non-mechanical locking/unlocking mechanism that unlocks the door 802 in response to a particular action. For example, in some aspects the access interface 804 represents a reader that is configured to read a magnetic strip of a card or other token device in response to the operator physically swiping the magnetic strip across the reader such that in response to the read, the door 802 unlocks.

Alternatively or additionally, in some aspects the access interface 804 represents a Radio-frequency identification (RFID) (or Near Field Communications (NFC)) reader that is configured to read a token device (e.g., a card) in response to the token device being within a threshold distance of the reader (e.g., indicative of the operator holding the token device near the reader without actually touching the reader) and/or being within a particular signal strength threshold (e.g., RSSI) range of the reader. In response to one or more of these thresholds being met, the door 802 is unlocked.

Alternatively or additionally, in some aspects the access interface 804 represents a biometric reader that reads a particular biometric attribute of an operator for authentication prior to the unlocking of the door 802. For example, in some aspects, the access interface 804 represents a retinal scanner that scans a retina of an eye of the operator, a fingerprint reader that reads a fingerprint of the operator, a gate reader that reads the gate or walking movements of the user, a facial recognition reader that reads the facial attributes of the operator, and/or a voice recognition reader that reads voice attributes of the user. The operator attributes read by one or more of these readers can be compared against a database of stored operator attribute features to determine whether there is a match to an identity of a particular operator to cause the door 802 to open.

Although the access interfaces 806 and 804 are illustrated as being visible on the rear surface 802-1, in some aspects they have a front view and corresponding interfaces that are configured to protrude outside of a front surface (e.g., the face surface 702) of the electrical housing unit 800. For example, the access interface 806 may include a key-hole aperture on the front surface. In another example, the access interface 804 may represent a card scanner and so a card scanner slot may be located on the front surface.

The alarm system 816 is configured to cause an audible alarm to be emitted in response to the door 802 being open. This is indicative of a security mechanism for unauthorized or non-authenticated entry to electrical components within the electrical housing unit 800. Detection of the door 802 being open can occur according to one or more suitable aspects. For example, in some aspects the electrical housing unit 800 includes a pressure sensor, a reed switch, and/or a magnet that detects movement of the door 802 outside of a movement or position threshold. This detection can alternatively or additionally occur via other sensors, such as a camera that uses object detection functionality (e.g., via a Convolutional Neural Network (CNN)) to detect the door 802 opening. In response to any one of these sensors detecting movement of the door 802 outside of a threshold, an auditory alarm is emitted. It is understood that the alarm can additionally or alternatively be any other type of alarm, such as a visual LED alarm.

In some embodiments, the alarm system 816 is deactivated or turned off in response to a key or token device being input at or near the access interfaces 806 and/or 804. For example, in response to the access interface 804 receiving a token device (e.g., an RFID card) within a threshold distance or signal strength from the access interface 804, the access interface 804 may send a control signal via a wire to the alarm system 816 to deactivate the alarm system 816. This effectively allows maintenance operators to bypass the alarm system 816 so that they do not have to hear the alarm while working within the electrical housing unit 800.

Figure 9:
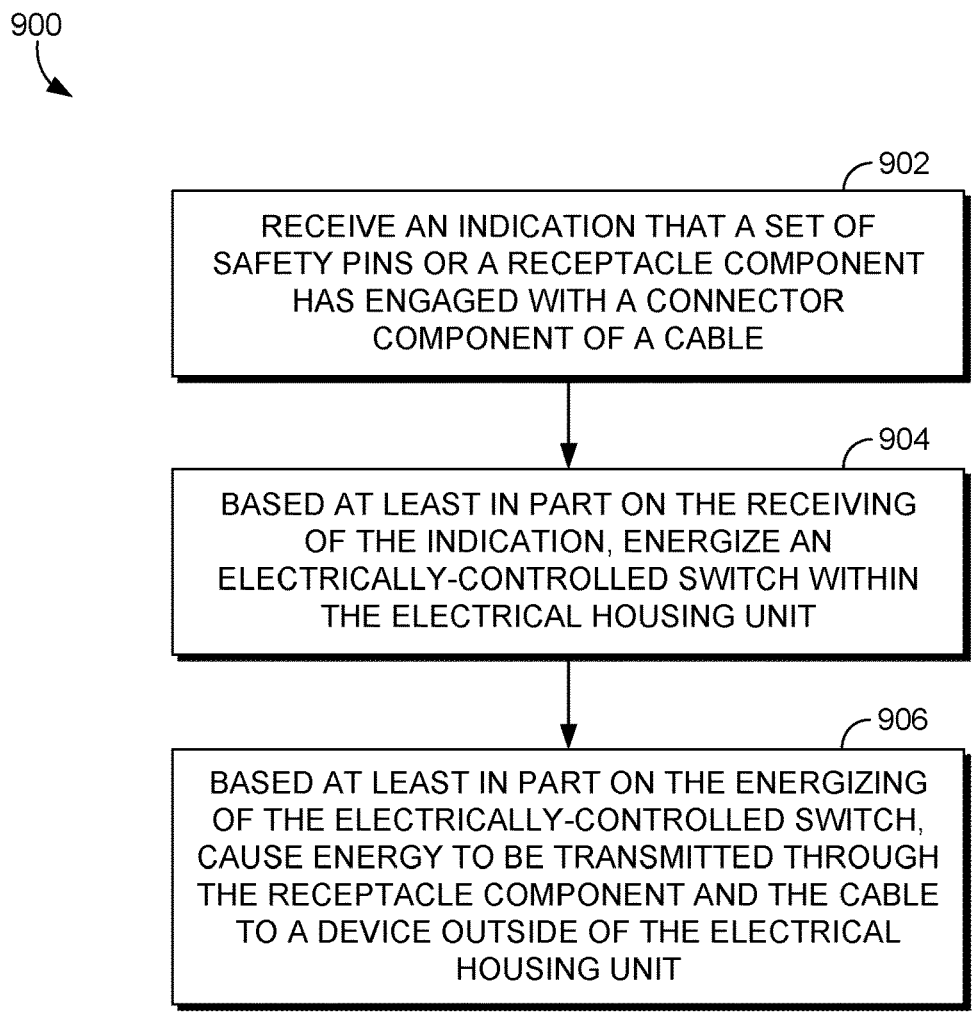
FIG. 9 is a flow diagram of an example process for causing energy to be transmitted to a load outside of an electrical housing unit, in accordance with aspects herein.

FIG. 9 is a flow diagram of an example process 900 for causing energy to be transmitted to a load outside of an electrical housing unit, according to some embodiments. The process 900 (and/or any of the functionality described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Such added blocks may include blocks that embody any functionality described herein, such as functionality described with respect to FIG. 1 through FIG. 8.

Per block 902, an indication that a set of safety pins of a receptacle component has engaged with a connector component of a cable. An "indication" in this context may refer to a control signal, a flag, or a communication signal from one electrical component to another at a particular level, or any other suitable indication. Examples of block 902 are described with respect to the receptacle 214 of FIG. 2, FIG. 3A, the receptacle 21 of FIG. 3B, and the schematic diagram of FIG. 4. For example, referring back to FIG. 2, the electrically-controlled switch component 220 can receive a signal, via the safety circuit 242, that the safety pin(s) 214-2 of the receptacle 214 have engaged the connector 206-1 of the cable 206 (e.g., a male set of prongs are mating with respective conductive apertures within the connector component 206-1).

In some embodiments, block 902 causes a power availability indicator (e.g., the power available indicator 3) to be activated. In some aspects, the power availability indicator is located at an outside surface (e.g., a third outside surface) of an electrical housing unit. The power availability indicator indicates whether there is power available to supply a device (e.g., the aircraft 102). Examples of block 902 and the positioning/functionality of the power availability indicator are described with respect to the power available indicator 3 of FIG. 3A.

In some embodiments, any electrical housing unit described herein includes one or more electrical components (e.g., FIGS. 3A through 3C). In some embodiments, an extension is coupled to a first outside surface of the electrical housing unit. For example, the extension can refer to and be oriented identical to the extension 22 of FIG. 3B. In another example, the extension can alternatively be oriented in the conduits 605, 603, and/or 601 as described with respect to FIG. 6. In some embodiments, the receptacle is coupled to the extension, the receptacle being configured to engage a connector component of a cable. Examples of the receptacle being coupled to the extension is described with respect to the extension 22 and the receptacle 21 of FIG. 3B. In some aspects, the receptacle is coupled to an outside surface associated with the electrical housing unit. For example, in some aspects, the receptacle 214 is coupled directly to any surface of the electrical housing unit 601 itself, such as in locations represented by conduit/receptacles 605, 603, and/or 601, as opposed to being located on the extension 216. In another example of the receptacle being coupled to an "outside surface associated with the electrical housing unit," the outside surface may be a surface of an extension (e.g., the extension 216 and/or 22) such that the receptacle is coupled to an extension, which is located on an outside surface of the electrical housing unit. In some aspects, the extension is located at a bottom portion (e.g., the bottom surface 314) of the electrical housing unit. In some aspects, the extension further extends at an angle that is substantially 45 degrees relative to a vertical length of the electrical housing unit. Examples of this are described with respect to the extension 22 of FIG. 3B.

Per block 904, based at least in part on the receiving of the indication, particular aspects energize an electrically-controlled switch within the electrical housing unit. Examples of this are described with respect to the energizing of the electrically-controlled switch component 220 of FIG. 2, energizing the contactor 12 based on power on indicator 4 and the start button 2 of FIG. 3A, the energizing of the contactor 12 of FIG. 3C, and/or the energizing of the contactor 402 of FIG. 4. As described herein, in some examples, the receptacle can include a set of safety pints that are configured to activate a safety circuit (e.g., the safety circuit 442) that energizes the contactor based on the set of safety pins connecting with respective receiving components (e.g., apertures) of the cable (e.g., as described with respect to the receptacle 214 of FIG. 4). In some embodiments, the electrically-controlled switch is a contactor that is configured to energize based at least in part on the receptacle engaging the connector component (e.g., as described with respect to the receptacle 214) or safety circuit.

In some embodiments, a power on indicator located at an outside surface of the electrical housing unit is activated in response to block 904. The power on indicator indicates whether the electrically-controlled switch is energized. Examples of this are described with respect to the power on indicator 4 that indicates whether the contactor 12 has been closed.

Per block 906, based at least in part on the energizing of the electrically-controlled switch, cause energy to be transmitted to a load outside of the electrical housing unit. Examples of this are described with respect to powering the aircraft 102 of FIG. 1, FIG. 2, FIGS. 3A through 3C, and/or FIG. 4. An various aspects, an energy supply component (e.g., the energy supply component 212) is configured to cause energy to be transmitted through the receptacle (e.g., and the extension), and the cable to a device outside of the electrical housing unit based on the electrically-controlled switch energizing, as described with respect to FIG. 1, FIG. 2, FIG. 3A, FIG. 3B, FIG. 3C, and/or FIG. 4.

In some aspects, the electrical housing unit includes an activation component (e.g., the start button 2) and/or deactivation component (e.g., the stop button 1) located on an outside surface of the electrical housing unit. In some aspects, the activation component initiates the process of supplying energy to a load or device. In some aspects, the activation component is configured to receive an operator request to provide power to a device. For example, in response to receiving an indication of a pressing of the start button 2, particular aspects provide energy to a load as described with respect to FIG. 3. In some aspects, the causing of the energy to be transmitted is based further on the operator request associated with the activation component. Examples of this are described with respect to the start button 2 of FIG. 3A. The deactivation component causes a halting or stoppage of energy flow to the load or device. For example, in response to receiving a pressing of the stop button 1, particular aspects stop the energy to a load as described with respect to FIG. 3A.

In some aspects, the electrical housing unit or electrical system enclosure in general includes at least one sensor, the at least one sensor being at least one of: an auditory alarm sensor, a voltage sensor, and a hertz sensor. Examples of this are described with respect to the electrical system enclosure 700 of FIG. 7 (e.g., the voltage meter 704, the hertz meter 706) and the electrical system enclosure 800 if FIG. 8 (e.g., the alarm system 816).

In some aspects, the electrical system enclosure includes a cover component that is disposed over the receptacle component. Examples of this are described with respect to the cover hinged cover 5 of FIG. 3B that is disposed (or configured to be disposed) over the receptacle 21. In some aspects, the device (or other load/machine) that is powered is an aviation vehicle, such as the aircraft 102 of FIG. 1. An aviation vehicle can be any suitable aviation vehicle, such as a drone, a helicopter, a commercial airline vehicle, a military fighter jet, or the like.

Figure 10:
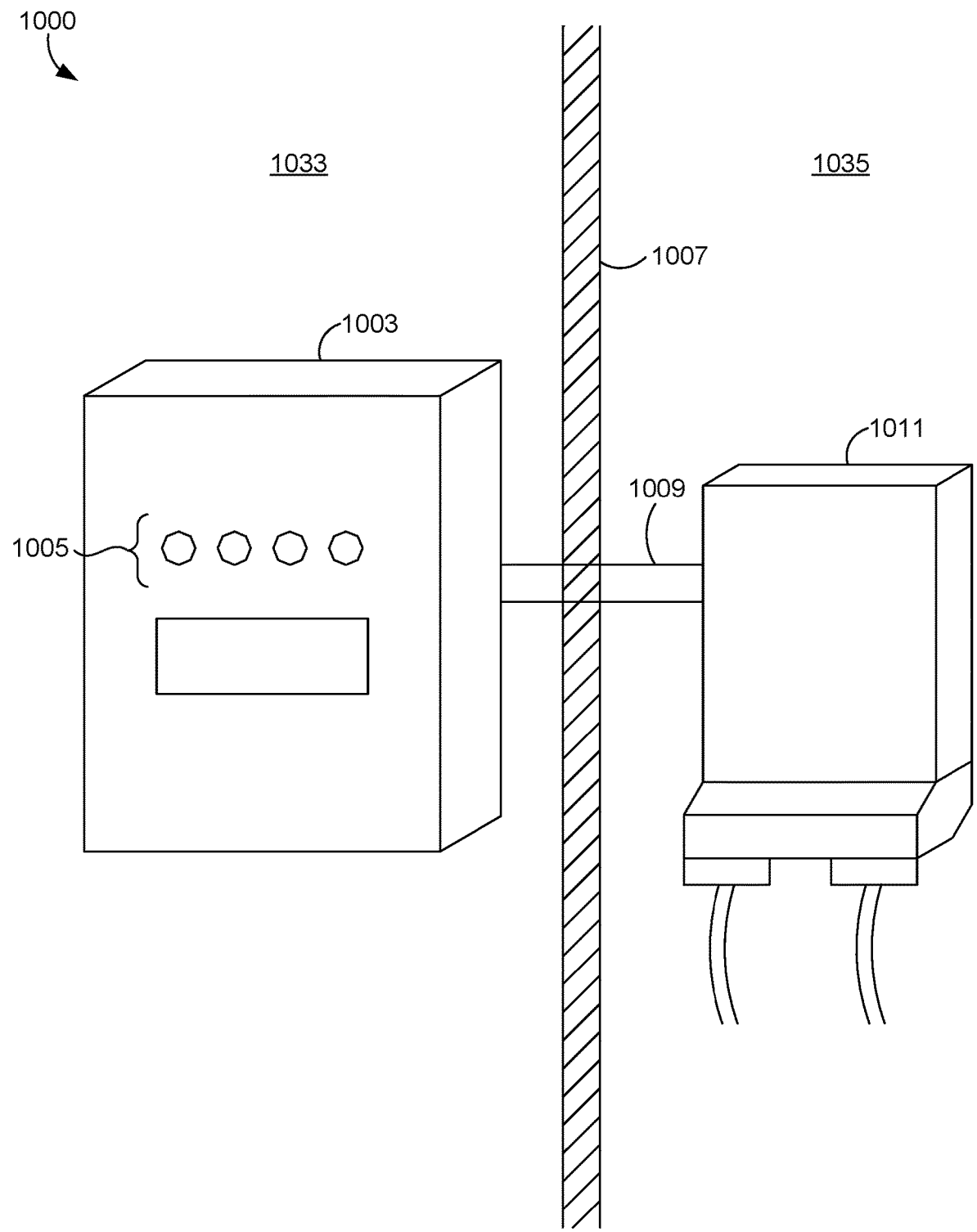
FIG. 10 illustrates a front view of an electrical system enclosure that meets certain explosion proof criteria, in accordance with aspects herein.

FIG. 10 illustrates a front view of an electrical system enclosure 1000 that is designed to meet certain explosion proof criteria, in accordance with aspects herein. When particular electrical components (e.g., a power supply, a rectifier, terminal strip) are located in a particular gaseous or flammable environment, any electrical arc created between such components can cause explosions, damage to eyesight, and electrical burns, among other things. An electrical arc is an electrical breakdown of a gas that produces extended electrical discharge. Certain standards, rules, regulations, laws, or protocols specify that electrical components that are capable of experiencing an electrical arc are to be located to an environment or area that does not carry relatively high risk of injury. For example, the National Electric Code (NEC) specifies that in order to meet Class 1, Division 2 requirements, any element that could experience an electrical arc is to be relocated to an environment/area that does not have flammability exposure. Accordingly, any electrical component may be relocated or situated to an area that does not have the environmental concerns concerning flammable vapors or environments. FIG. 10 illustrates an electrical system enclosure that meets class 1, division 2 requirements.

FIG. 10 illustrates the electrical housing unit 1003 within a first area 1033, which is communicatively coupled, via the contacts or wires 1009, to the electrical housing unit 1011 located in a second area 1035. The areas 1033 and 1035 are separated by a wall or other barrier 1007. The area 1033 represents a geographical area environment that presents or includes flammable or explosive vapors. For example, such areas may include a fuel depot or fuel storage area, a maintenance hangar, a paint booth and the like. The area 1035 represents a benign environment that does not include flammable or explosive vapors or risks.

FIG. 10 illustrates certain electrical components that may remain in a flammable environment, such as area 1033. Those electrical components that may remain in a flammable environment may include the indicator(s)/switch interface(s) 10005. In some embodiments, the indicator(s)/switch interface(s) 10005 are represented as the interface(s)/switch interface(s) 230, as described with respect to FIG. 2, and/or the indicators/buttons 1, 2, 3, and/or 4 of FIG. 3A. However, other electrical components, such as those within the electrical housing unit 1011, are to be placed in the non-flammable area 1035 such that there is no excessive risk of explosion, eye damage, fires, and the like if an electrical arc were to occur. In some embodiments, such electrical components include some or each of the electrical components within the electrical housing unit 300, as illustrated in FIG. 3C (e.g., the contactor 12, the E and F terminal block 19, the Fuse 8).

Figure 11:
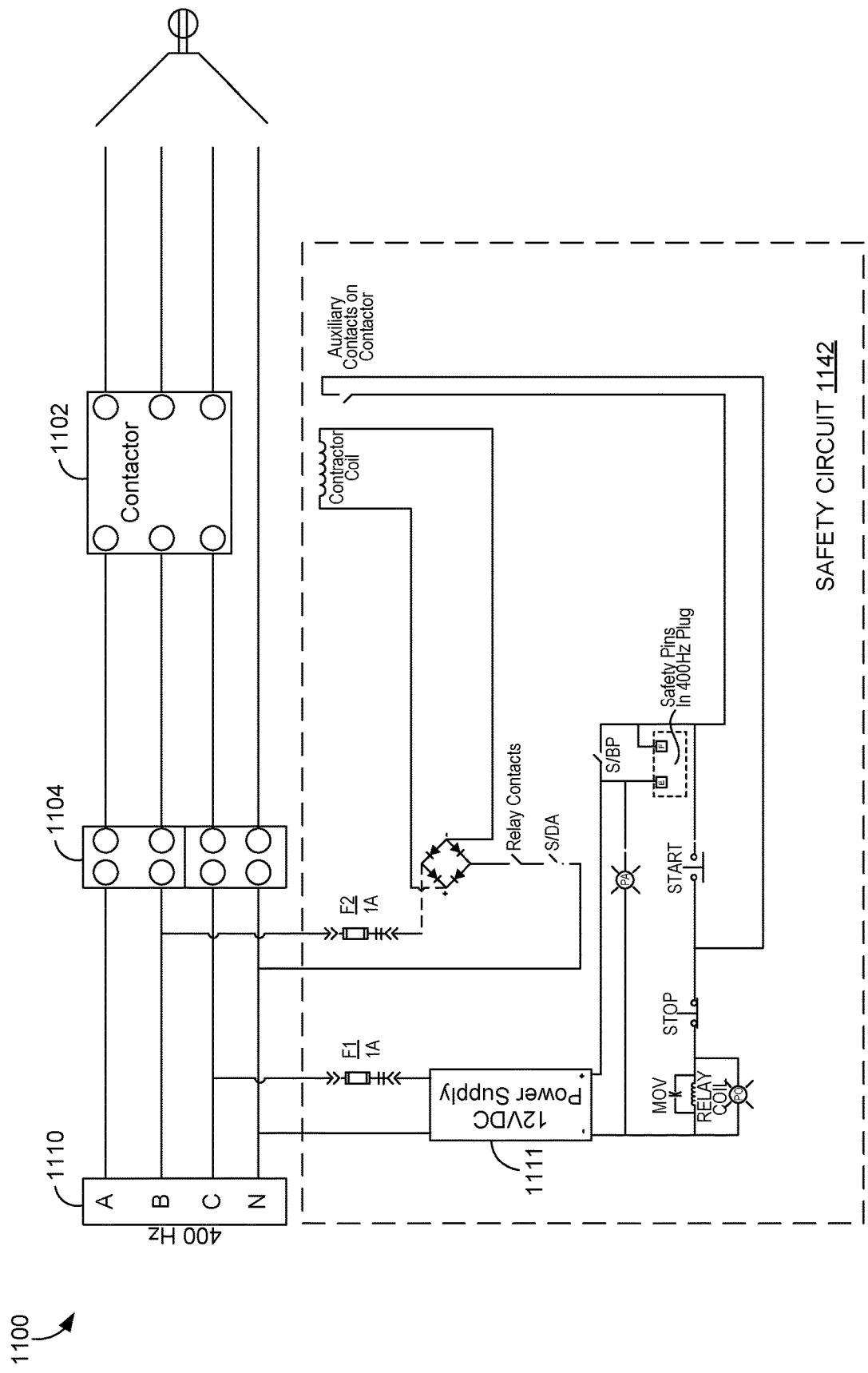
FIG. 11 is a schematic diagram illustrating how a contactor is energized via a safety circuit, in accordance with aspects herein.

FIG. 11 is a schematic diagram illustrating how a contactor 402 is energized via a safety circuit 1142, according to particular embodiments. In some aspects, FIG. 11 represents circuitry within the electrical housing unit 1003 and/or 1011. The safety circuit 1142 represents a different configuration relative to the safety circuit 442, as illustrated. In some aspects, the safety circuit 1142 represents any safety circuit described herein, such as with respect to FIGS. 3A through 3C. In some aspects, FIG. 11 represents circuitry located within the electrical housing unit 210, and/or FIGS. 3A through 3C in order to supply energy to power a device or machine.

The set of wires 1110 include wires A, B, and C, which tie into the power block 1104 and further tie into the contactor 1102 to energize the contactor 1102 when power is supplied via the power supplied via the power supply 1108. Energizing the contactor 1102 activates or triggers current flow or energy transfer out of respective pins corresponding to wires A, B, C to a load (via a cable), such as a particular machine (e.g., the aircraft 102). Wires A, B, and C represent live wires, whereas wire N represents a neutral wire that ties into a neutral block. In some embodiments, each of these components—the set of wires A, B, C, N, the contactor 1102, and the power block 1104 represent the circuit 240 of FIG. 2 and vice versa. In some aspects, the power block 1104 represents the power block 7 of FIG. 3C and vice versa. Likewise, in some aspects the contactor 1102 represents the contactor 12 of FIG. 3C and vice versa.

FIG. 11 also illustrates a safety circuit 1142 that is configured to energize the contactor 1102. In some embodiments, the safety circuit 1142 represents the safety circuit 242 and/or the safety circuit described with respect to FIGS. 3A through 3C. As illustrated in the schematics of the safety circuit 1142, there are 2 pins E and F. In various aspects, each of the wires A, B, C, and N each also formulate individual pins, thereby making a total of 6 pins (4 pins coming from wires A, B, C, and N and 2 safety pins forming respective wires) that formulate a receptacle (e.g., the receptacle 214 and/or the receptacle 21), where each of the 6 pins are configured to engage a connector (e.g., the connector 206-1) by being plugged into respective 6 apertures (e.g., via friction fit). The safety circuit 1142 also illustrates that no power is supplied by the power supply 1108 in order to energize the contactor 1102 unless and until the safety circuit 1142 has performed its functionality. In some embodiments, the power supply 1108 represents the power supply 6 of FIG. 3C and vice versa.

Figure 12:
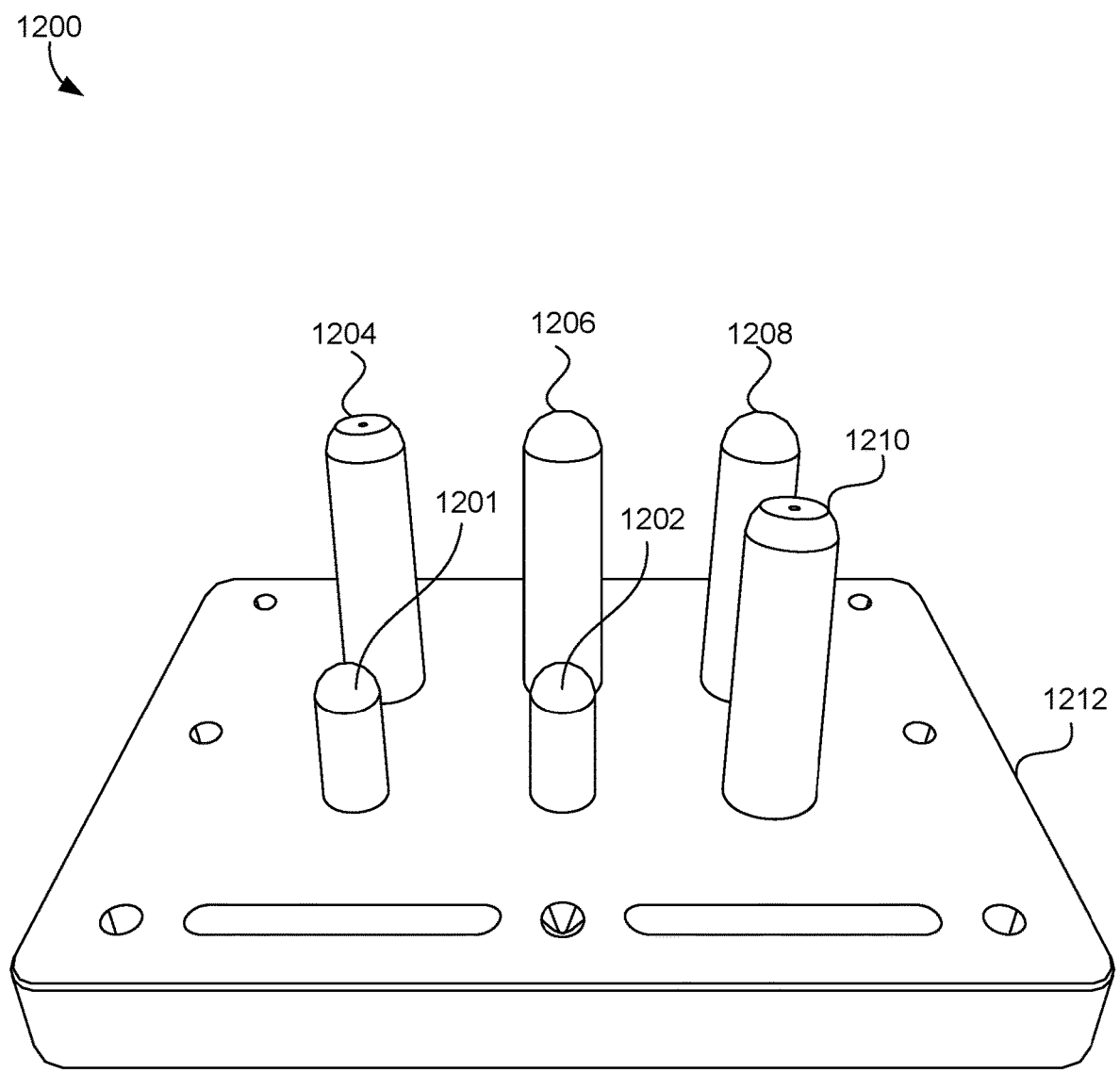
FIG. 12 illustrates an example receptacle, in accordance with aspects herein.

FIG. 12 illustrates an example receptacle 1200, according to some aspects. In some embodiments, the receptacle 1200 represents the receptacle 214 of FIG. 2, the receptacle 21 of FIG. 3, the receptacle 507 of FIG. 5, the receptacle 607 of FIG. 6, or the receptacle 716 of FIG. 7. The receptacle 1200 includes prongs 1201, 1202, 1204, 1206, 1208, and 1210, each of which are coupled or fixed to the receptacle base 1212.

As illustrated in FIG. 12, the prongs 1201 and 1202 are substantially the same length and both are shorter in length relative to the rest of the prongs 1204, 1206, 1208, and 1210. In some embodiments, these shorter prongs 1201 and 1202 represents the safety pin(s) 214-2 of FIG. 2. Likewise, in some embodiments, the longer prongs 1204, 1206, 1208, and 1210 represent the pin(s) 214-1 of FIG. 2. As described herein, in some aspects a first set of prongs, such as prongs 1204, 1206, 1208, and 1210, are longer in length relative to a second set of prongs, such as prongs 1201 and 1202. In this way, when the receptacle 1200 engages or otherwise plugs into a connector (e.g., the connector 206-1), because the first set of prongs are longer relative to the second set of prongs, they will engage the connector first in time before the second set of prongs. Responsively (and later in time), the second set of prongs will engage the connector and engage a safety circuit, thereby allowing an electrically-controlled switch to be activated (e.g., and responsively triggering the power available indicator 3 to illuminate), which energizes an electrical system enclosure and allows energy to be transmitted (e.g., via a push of the start button 2 or automatically) from the electrical system enclosure to a device (e.g., an aircraft), as described herein.

In addition to a difference in the relative length of prongs 1201, 1202 extending from the base as compared to the length of prongs 1204, 1206, 1208, and 1210, there is a difference in relative diameter between the two sets of prongs. For example, it is contemplated that the prongs 1201 and 1202 have a different cross section, such as a smaller diameter, than one or more other prongs (e.g., prongs 1204, 1206, 1208, and 1210). The intentional variability in the cross section between the first set of prongs (e.g., prongs 1204, 1206, 1208, and 1210) and the second set of prongs (e.g., prongs 1201, 1202) that may be used in a safety circuit can be effective to ensuring proper alignment with the connector to the receptacle 1200.

In addition to variability in length and cross section, it is contemplated that the receptacle 1200, as depicted, positions one or more of each prong in a specified location. For example the two prongs of the second set of prongs may be grouped together and at least partially surrounded by prongs of the first set of prongs along a planar surface of the receptacle base 1212. In an alternative example, a first prong may be positioned opposite and/or separated from a second prong of the second set of prongs.

It is understood that the receptacle 1200 is representative only and that any suitable receptacle, according to any particular receptacle standard may be utilized. For example, some receptacles have more or fewer prongs than illustrated in FIG. 12. Likewise, some receptacle bases and/or prongs have different shapes and/or lengths relative to the receptacle 1200 of FIG. 12.

Aspects of the present disclosure have been described with the intent to be illustrative rather than restrictive. Alternative aspects will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

What is claimed is:

1. A system for powering a device, the system comprising:
an electrical housing unit that includes outside surfaces, the outside surfaces defining an outer boundary of the electrical housing unit and the outside surfaces further enclosing a volume of space, the volume of space including one or more electrical components;
an extension coupled, at a first end, to a first outside surface of the outside surfaces of the electrical housing unit, and the extension further extending, at a second end, beyond the first outside surface such that the extension is not included in the volume of space;
a receptacle included in the extension, the receptacle configured to engage a connector component of a cable;
an electrically-controlled switch, of the one or more electrical components, within the volume of space, the electrically-controlled switch configured to energize based, at least in part, on the receptacle engaging the connector component; and
an energy supply component, of the one or more electrical components, within the volume of space, the energy supply component is configured to cause energy to be transmitted through the receptacle to the connector component and the cable to the device outside of the outside surfaces of the electrical housing unit based, at least in part, on the electrically-controlled switch energizing.

2. The system of claim 1, wherein the outside surfaces of the electrical housing unit comprises a top surface and a bottom surface, the extension extends from the bottom surface of the electrical housing unit, and wherein the extension further extends at an angle that is substantially 45 degrees relative to a vertical direction between the top surface and the bottom surface of the electrical housing unit.

3. The system of claim 1, wherein the receptacle includes one or more safety pins, the one or more safety pins are configured to activate a safety circuit that grounds a ground wire of the receptacle such that an operator does not have exposure to experience electrical shock and the one or more safety pins are configured to further activate the electrically-controlled switch, wherein the electrically-controlled switch that is configured to energize is based further on the one or more safety pins connecting with one or more respective receiving components of the cable.

4. The system of claim 1, further comprising a power availability indicator located at a third outside surface of the outside surfaces electrical housing unit, the power availability indicator is effective to indicate whether there is sufficient power available to supply to the device.

5. The system of claim 1, further comprising a power indicator located at a third outside surface of the outside surfaces of the electrical housing unit, the power indicator is effective to indicate whether the electrically-controlled switch is energized.

6. The system of claim 1, wherein the energy supply component supplies a frequency of at least substantially 400 Hertz.

7. The system of claim 1, further comprising at least one sensor located within the volume of space within the electrical housing unit, the at least one sensor being at least one of: an auditory sensor, a voltage sensor, and a hertz sensor.

8. The system of claim 1, further comprising a cover component, the cover component is disposed over the receptacle in at least a first configuration.

9. The system of claim 1, further comprising an activation component coupled to a second outside surface of the outside surface of the electrical housing unit, the activation component is configured to receive an operator request to provide power to the device, and wherein and the electrically-controlled switch being configured to energize is based further on the operator request.

10. An electrical system enclosure comprising:
an electrical housing unit that includes outside surfaces, the outside surfaces at least partially defining an outer boundary of the electrical housing unit and the outside surfaces at least partially enclosing a volume of space, the volume of space including one or more electrical components;
a receptacle coupled to the outside surfaces or coupled to an extension that is coupled to a first surface of the outside surfaces, the receptacle configured to engage a connector component of a cable;
a contactor within the volume of space, the contactor configured to close based, at least in part, on the receptacle engaging the connector component; and
an energy supply component configured to cause energy to be transmitted through the receptacle and the cable to a device outside of the outside surfaces of the electrical housing unit based on the contactor closing.

11. The electrical system enclosure of claim 10, further comprising the extension coupled to a first outside surface of the outside surfaces of the electrical housing unit, wherein the first outside surface is a part of the extension.

12. The electrical system enclosure of claim 10, wherein the receptacle includes a plurality of safety pins that are configured to activate a safety circuit that de-energizes the one or more electrical components, wherein the closing of the contactor is based further on the plurality of safety pins connecting with one or more respective receiving components of the cable.

13. The electrical system enclosure of claim 10, further comprising a power availability indicator located at a second outside surface of the outside surfaces of the electrical housing unit, the power availability indicator is effective to indicate there is sufficient power available to supply to the device.

14. The electrical system enclosure of claim 10, further comprising a power indicator located at a second outside surface of the outside surfaces of the electrical housing unit, the power indicator is effective to indicate the contactor is energized.

15. The electrical system enclosure of claim 10, further comprising a deactivation component located at a second outside surface of the outside surfaces of the electrical housing unit, the deactivation component is effective to cease energy flow to the device.

16. The electrical system enclosure of claim 10, further comprising at least one sensor located within the volume of space, the at least one sensor being at least one of: an auditory alarm sensor, a voltage sensor, and a hertz sensor.

17. The electrical system enclosure of claim 10, wherein the device includes a second receptacle capable of being coupled to an aviation vehicle.

18. The electrical system enclosure of claim 10, further comprising an activation component coupled to a second outside surface of the outside surfaces of the electrical housing unit, the activation component is configured to receive an operator request to provide power to the device, and wherein and the contactor being configured to energize is based further on the operator request.

19. A method for powering a device outside of an electrical housing unit, the method comprising:
receiving an indication that a receptacle component has engaged with a connector component of a cable, the receptacle component being coupled to a first outside surface of outside surfaces of the electrical housing unit, the outside surfaces at least partially defining an outer boundary of the electrical housing unit and the outside surfaces at least partially enclosing a volume of space, the volume of space including one or more electrical components;
based at least in part on the receiving of the indication, energizing an electrically-controlled switch within the volume of space of the electrical housing unit; and
based at least in part on the energizing of the electrically-controlled switch, causing energy to be transmitted through the receptacle component and the cable to a device outside of the outside surfaces of the electrical housing unit.

20. The method of claim 19, wherein the receiving of the indication includes receiving a signal that a set of safety pins have activated a safety circuit that de-energizes the one or more electrical components associated, wherein the energizing of the electrically-controlled switch is based further on the set of safety pins connecting with respective receiving components of the cable.

\* \* \* \* \*